(12) United States Patent
Yasui et al.

(10) Patent No.: US 12,265,202 B2
(45) Date of Patent: Apr. 1, 2025

(54) FAR-INFRARED RAY TRANSMISSION MEMBER AND METHOD FOR MANUFACTURING FAR-INFRARED RAY TRANSMISSION MEMBER

(71) Applicant: AGC Inc., Tokyo (JP)

(72) Inventors: Yoji Yasui, Tokyo (JP); Kazunobu Maeshige, Tokyo (JP); Takahiro Mashimo, Tokyo (JP); Takuji Oyama, Tokyo (JP); Nobutaka Aomine, Tokyo (JP); Manaya Kubono, Tokyo (JP)

(73) Assignee: AGC INC., Tokyo (JP)

( * ) Notice: Subject to any disclaimer, the term of this patent is extended or adjusted under 35 U.S.C. 154(b) by 56 days.

(21) Appl. No.: 18/111,518

(22) Filed: Feb. 17, 2023

(65) Prior Publication Data

US 2023/0194759 A1 Jun. 22, 2023

Related U.S. Application Data

(63) Continuation of application No. PCT/JP2021/030619, filed on Aug. 20, 2021.

(30) Foreign Application Priority Data

Aug. 27, 2020 (JP) .................. 2020-143652

(51) Int. Cl.
*G02B 1/10* (2015.01)
*B60R 1/00* (2022.01)
*G02B 13/14* (2006.01)

(52) U.S. Cl.
CPC ............... *G02B 1/10* (2013.01); *B60R 1/001* (2013.01); *G02B 13/14* (2013.01)

(58) Field of Classification Search
None
See application file for complete search history.

(56) References Cited

U.S. PATENT DOCUMENTS 4,995,684 A 2/1991 Tustison et al.
2018/0299587 A1 10/2018 Aitken et al.

FOREIGN PATENT DOCUMENTS

| JP | S62-299901 A | 12/1987 |
| JP | H06-313802 A | 11/1994 |
| JP | 3704739 B2 | 10/2005 |

(Continued)

OTHER PUBLICATIONS

Machine translation, JP 2017-151409 (Year: 2017).*

(Continued)

*Primary Examiner* — Michael G Miller
(74) *Attorney, Agent, or Firm* — Foley & Lardner LLP

(57) ABSTRACT

To appropriately suppress reflection of far-infrared rays, and appropriately form an antireflection film. A far-infrared ray transmission member (20) includes a base material (30) that transmits far-infrared rays, and a functional film (32) that is formed on the base material (30) and includes a low refractive index layer (34) containing oxide as a principal component and having a refractive index equal to or smaller than 1.5 with respect to light at a wavelength of 10 μm. The low refractive index layer (34) contains MgO as a principal component, and a content of MgO is equal to or larger than 50 mass % and equal to or smaller than 100 mass % with respect to the entire low refractive index layer (34).

17 Claims, 8 Drawing Sheets

(56) References Cited

FOREIGN PATENT DOCUMENTS

JP          2017151409 A   *  8/2017
KR          20200019484 A      7/2020
WO     WO-2015/076914 A1      5/2015

OTHER PUBLICATIONS

International Searching Authority, "International Search Report," issued in connection with International Patent Application No. PCT/JP2021/030619, dated Oct. 26, 2021.
International Searching Authority, "Written Opinion," issued in connection with International Patent Application No. PCT/JP2021/030619, dated Oct. 26, 2021.
Extended European Search Report for EPO App. No. 21861438.6 dated Aug. 9, 2024, 6 pages.

* cited by examiner

FAR-INFRARED RAY TRANSMISSION MEMBER AND METHOD FOR MANUFACTURING FAR-INFRARED RAY TRANSMISSION MEMBER

CROSS-REFERENCE TO RELATED APPLICATION(S)

This application is a continuation of International Application No. PCT/JP2021/030619, filed on Aug. 20, 2021, which claims priority to Japanese Patent Application No. 2020-143652, filed on Aug. 27, 2020. The contents of these applications are hereby incorporated by reference in their entireties.

FIELD

The present invention relates to a far-infrared ray transmission member and a method for manufacturing the far-infrared ray transmission member.

BACKGROUND

For example, in attaching a far-infrared sensor to a vehicle and the like, a far-infrared ray transmission member that transmits far-infrared rays may be disposed so that far-infrared rays are appropriately incident on the far-infrared sensor in some cases. Such a far-infrared ray transmission member is required to suppress reflection of far-infrared rays and increase a transmittance of far-infrared rays. To suppress reflection, there is known a technique of forming an antireflection film (AR film; Anti Reflection film) on a base material. For example, Patent Literature 1 discloses an optical member capable of transmitting infrared rays in which a first layered film and a second layered film as antireflection films are laminated on a substrate. Furthermore, there is known an antireflection film for far-infrared rays using fluoride such as $MgF_2$. Patent Literature 2 discloses an infrared ray transmission structure for far-infrared rays using fluoride such as $MgF_2$ as a low refractive index layer.

CITATION LIST

Patent Literature

Patent Literature 1: Japanese Patent Application Laid-open No. S62-299901
Patent Literature 2: Japanese Patent No. 3704739

SUMMARY

Technical Problem

However, for example, in a case of using the first layered film and the second layered film in Patent Literature 1, according to characteristics of the films disclosed in Patent Literature 1, there is room for improvement in appropriately suppressing reflection of far-infrared rays such that a film thickness is required to be increased to give appropriate antireflection performance, for example. Additionally, fluoride such as $MgF_2$ gives poor adhesion to a base material or an inorganic film. Furthermore, the number of options of a forming process on the base material is small, and there is room for improvement in causing the forming process to be flexible. Thus, there is a demand for appropriately suppressing reflection of far-infrared rays, and enabling an antireflection film to be appropriately formed.

The present invention aims at providing a far-infrared ray transmission member that appropriately suppresses reflection of far-infrared rays and is capable of appropriately forming an antireflection film, and a method for manufacturing the far-infrared ray transmission member.

Solution to Problem

To solve the problem and achieve the object above, a far-infrared ray transmission member of the present disclosure comprises: a base material configured to transmit far-infrared rays; and a functional film that is formed on the base material, and includes a low refractive index layer containing oxide as a principal component and having a refractive index equal to or smaller than 1.5 with respect to light at a wavelength of 10 μm, wherein the low refractive index layer contains MgO as a principal component, and a content of MgO is equal to or larger than 50 mass % and equal to or smaller than 100 mass % with respect to the entire low refractive index layer.

To solve the problem and achieve the object above, a method for manufacturing a far-infrared ray transmission member of the present disclosure comprises manufacturing a far-infrared ray transmission member by forming, on a base material configured to transmit far-infrared rays, a functional film including a low refractive index layer that contains oxide as a principal component and has a refractive index equal to or smaller than 1.5 with respect to light at a wavelength of 10 μm, wherein the low refractive index layer contains MgO as a principal component, and a content of MgO is equal to or larger than 50 mass % and equal to or smaller than 100 mass % with respect to the entire low refractive index layer.

Advantageous Effects of Invention

According to the present invention, reflection of far-infrared rays can be appropriately suppressed, and an antireflection film can be appropriately formed.

DESCRIPTION OF EMBODIMENTS

The following describes a preferred embodiment of the present invention in detail with reference to the attached drawings. The present invention is not limited to this embodiment, and in a case in which there are a plurality of embodiments, the present invention encompasses a combination of the embodiments. Numerical values encompass rounded numerical values.

(Vehicle)

Figure 1:
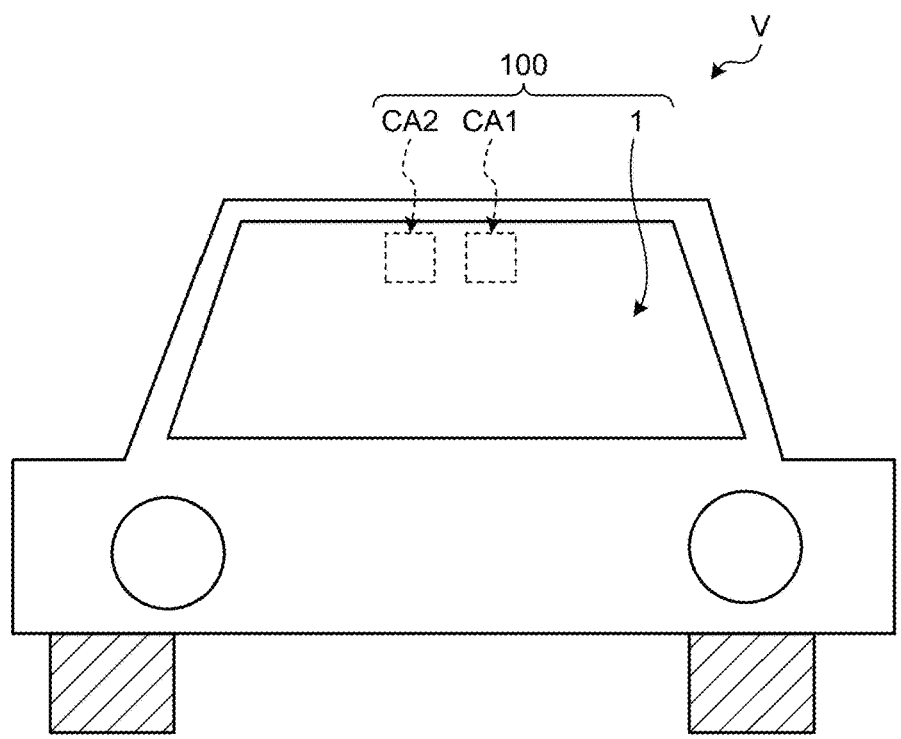
FIG. 1 is a schematic diagram illustrating a state in which glass for vehicles according to the present embodiment is mounted on a vehicle.

FIG. 1 is a schematic diagram illustrating a state in which glass for vehicles according to the present embodiment is mounted on a vehicle. As illustrated in FIG. 1, the glass 1 for vehicles according to the present embodiment is mounted on a vehicle V. The glass 1 for vehicles is a window member applied to a windshield of the vehicle V. That is, the glass 1 for vehicles is used as a front window of the vehicle V, in other words, as wind shield glass. A far-infrared camera CA1 and a visible light camera CA2 are mounted in an inner part (inside) of the vehicle V. The inner part (inside) of the vehicle V indicates the inside of a compartment in which a driver's seat for a driver is disposed, for example.

The glass 1 for vehicles, the far-infrared camera CA1, and the visible light camera CA2 configures a camera unit 100 according to the present embodiment. The far-infrared camera CA1 is a camera that detects far-infrared rays, and takes a thermal image of the outside of the vehicle V by detecting far-infrared rays from the outside of the vehicle V. The visible light camera CA2 is a camera that detects visible light, and takes an image of the outside of the vehicle V by detecting visible light from the outside of the vehicle V. The camera unit 100 may further include a LiDAR or a millimetric wave radar, for example, in addition to the far-infrared camera CA1 and the visible light camera CA2. Herein, far-infrared rays are electromagnetic waves having a wavelength in a wavelength range from 8 µm to 13 µm, for example, and visible light is electromagnetic waves having a wavelength in a wavelength range from 360 nm to 830 nm, for example. Herein, "8 µm to 13 µm" and "360 nm to 830 nm" respectively indicate "equal to or larger than 8 µm and equal to or smaller than 13 µm" and "equal to or larger than 360 nm and equal to or smaller than 830 nm". The same applies to the following description. The far-infrared rays may be electromagnetic waves having a wavelength in a wavelength range from 8 µm to 12 µm.

(Glass for Vehicles)

Figure 2:
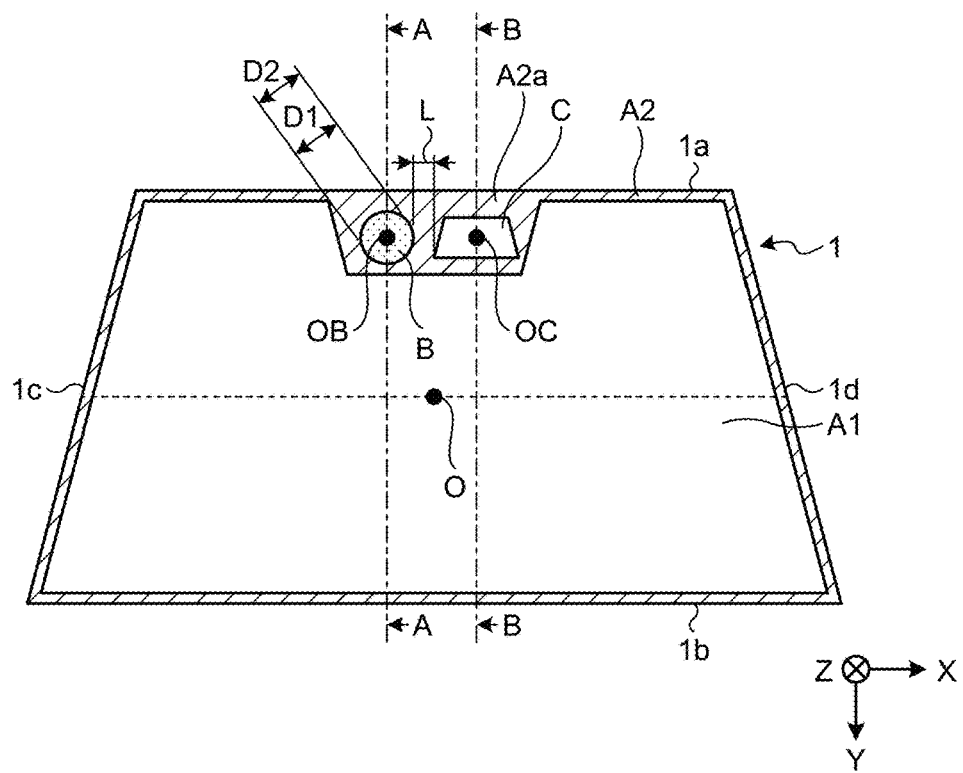
FIG. 2 is a schematic plan view of glass 1 for vehicles according to a first embodiment.
Figure 3:
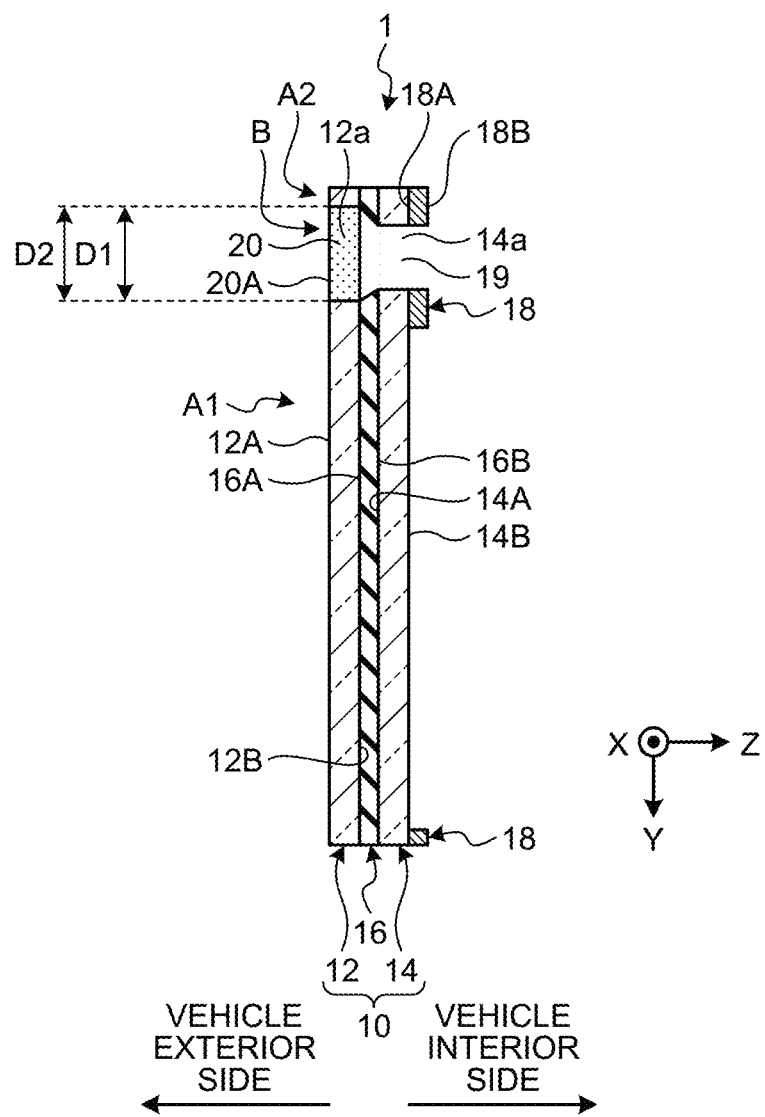
FIG. 3 is a cross-sectional view along a line A-A in FIG. 2.
Figure 4:
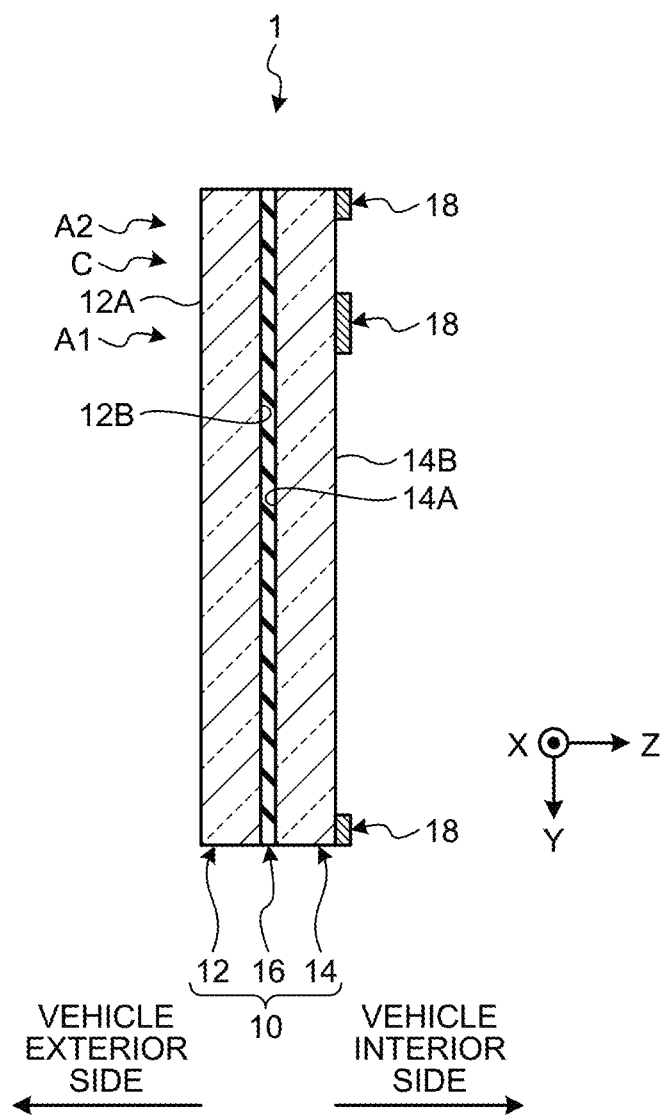
FIG. 4 is a cross-sectional view along a B-B cross section in FIG. 2.

FIG. 2 is a schematic plan view of the glass 1 for vehicles according to a first embodiment. FIG. 3 is a cross-sectional view along a line A-A in FIG. 2. FIG. 4 is a cross-sectional view along a B-B cross section in FIG. 2. As illustrated in FIG. 2, an upper edge of the glass 1 for vehicles is assumed to be an upper edge part 1a, a lower edge thereof is assumed to be a lower edge part 1b, one of side edges is assumed to be a side edge part 1c, and the other one of the side edges is assumed to be a side edge part 1d hereinafter. The upper edge part 1a is an edge portion positioned on an upper side in a vertical direction when the glass 1 for vehicles is mounted on the vehicle V. The lower edge part 1b is an edge portion positioned on a lower side in the vertical direction when the glass 1 for vehicles is mounted on the vehicle V. The side edge part 1c is an edge portion positioned on one of lateral sides when the glass 1 for vehicles is mounted on the vehicle V. The side edge part 1d is an edge portion positioned on the other one of the lateral sides when the glass 1 for vehicles is mounted on the vehicle V.

Hereinafter, among directions parallel to a surface of the glass 1 for vehicles, a direction from the upper edge part 1a toward the lower edge part 1b is assumed to be a Y-direction, and a direction from the side edge part 1c toward the side edge part 1d is assumed to be an X-direction. In the present embodiment, the X-direction is orthogonal to the Y-direction. A direction orthogonal to the surface of the glass 1 for vehicles, that is, a thickness direction of the glass 1 for vehicles is assumed to be a Z-direction. The Z-direction is, for example, a direction from a vehicle exterior side toward a vehicle interior side of the vehicle V when the glass 1 for vehicles is mounted on the vehicle V. The X-direction and the Y-direction extend along the surface of the glass 1 for vehicles. For example, in a case in which the surface of the glass 1 for vehicles is a curved surface, the X-direction and the Y-direction may be directions tangent to the surface of the glass 1 for vehicles at a center point O of the glass 1 for vehicles. The center point O is a center position of the glass 1 for vehicles in a case of viewing the glass 1 for vehicles from the Z-direction.

A transparent region A1 and a light blocking region A2 are formed on the glass 1 for vehicles. The transparent region A1 is a region occupying a center portion of the glass 1 for vehicles when viewed from the Z-direction. The transparent region A1 is a region for securing a visual field of the driver. The transparent region A1 is a region for transmitting visible light. The light blocking region A2 is a region formed around the transparent region A1 when viewed from the Z-direction. The light blocking region A2 is a region for blocking visible light. In a light blocking region A2a as a portion on the upper edge part 1a side in the light blocking region A2, a far-infrared ray transmission region B and a visible light transmission region C are formed.

The far-infrared ray transmission region B is a region that transmits far-infrared rays, and is a region in which the far-infrared camera CA1 is disposed. That is, the far-infrared camera CA1 is disposed at a position overlapping the far-infrared ray transmission region B when viewed from an optical axis direction of the far-infrared camera CA1. The visible light transmission region C is a region that transmits visible light, and is a region in which the visible light camera CA2 is disposed. That is, the visible light camera CA2 is disposed at a position overlapping the visible light transmission region C when viewed from an optical axis direction of the visible light camera CA2.

As described above, the far-infrared ray transmission region B and the visible light transmission region C are formed in the light blocking region A2, so that the light blocking region A2 blocks far-infrared rays in a region other than the region in which the far-infrared ray transmission region B is formed, and blocks visible light in a region other than the region in which the visible light transmission region C is formed. The light blocking region A2a is formed around the far-infrared ray transmission region B and the visible light transmission region C. It is preferable that various sensors are protected from sunlight due to the light blocking region A2a disposed therearound. This configuration is preferable also in view of design because wiring of various sensors are invisible from the outside of the vehicle.

As illustrated in FIG. 3, the glass 1 for vehicles includes a glass base body 12 (first glass base body), a glass base body 14 (second glass base body), an intermediate layer 16, and a light blocking layer 18. In the glass 1 for vehicles, the glass base body 12, the intermediate layer 16, the glass base body 14, and the light blocking layer 18 are laminated in this order toward the Z-direction. The glass base body 12 and the glass base body 14 are fixed (bonded) to each other via the intermediate layer 16.

As the glass base bodies 12 and 14, for example, soda-lime glass, borosilicate glass, aluminosilicate glass, and the like can be used. The intermediate layer 16 is a bonding layer that bonds the glass base body 12 to the glass base body 14. As the intermediate layer 16, for example, a polyvinyl butyral (hereinafter, also referred to as PVB) modified material, an ethylene-vinyl acetate copolymer (EVA)-based material, an urethane resin material, a vinyl chloride resin material, and the like can be used. More specifically, the glass base body 12 includes one surface 12A and another surface 12B, and the other surface 12B is being in contact with one surface 16A of the intermediate layer 16 to be fixed (bonded) to the intermediate layer 16. The glass base body 14 includes one surface 14A and another surface 14B, and the one surface 14A is being in contact with another surface 16B of the intermediate layer 16 to be fixed (bonded) to the intermediate layer 16. As described above, the glass 1 for vehicles is laminated glass in which the glass base body 12 and the glass base body 14 are laminated. However, the glass 1 for vehicles is not limited to the laminated glass, and may have a configuration including only one of the glass base body 12 and the glass base body 14, for example. In this case, the intermediate layer 16 is not necessarily disposed. In the following description, in a case of not distinguishing the glass base bodies 12 and 14 from each other, each of them is referred to as a glass base body 10.

The light blocking layer 18 includes one surface 18A and another surface 18B, and the one surface 18A is being in contact with and fixed to the other surface 14B of the glass base body 14. The light blocking layer 18 is a layer that blocks visible light. As the light blocking layer 18, for example, a ceramic light blocking layer and a light blocking film can be used. As the ceramic light blocking layer, for example, a ceramic layer made of conventionally known material, such as a black ceramic layer, can be used. As the light blocking film, for example, a light blocking polyethylene terephthalate (PET) film, a light blocking polyethylene naphthalate (PEN) film, a light blocking polymethyl methacrylate (PMMA) film, and the like can be used.

In the present embodiment, a side on which the light blocking layer 18 is disposed of the glass 1 for vehicles is an interior side of the vehicle V (vehicle interior side), and a side on which the glass base body 12 is disposed thereof is an exterior side of the vehicle V (vehicle exterior side), but the embodiment is not limited thereto. The light blocking layer 18 may be disposed on the exterior side of the vehicle V. In a case in which the glass 1 for vehicles is constituted of laminated glass of the glass base bodies 12 and 14, the light blocking layer 18 may be formed between the glass base body 12 and the glass base body 14.

(Light Blocking Region)

The light blocking region A2 is formed by disposing the light blocking layer 18 on the glass base body 10. That is, the light blocking region A2 is a region in which the glass base body 10 includes the light blocking layer 18. That is, the light blocking region A2 is a region in which the glass base body 12, the intermediate layer 16, the glass base body 14, and the light blocking layer 18 are laminated. On the other hand, the transparent region A1 is a region in which the glass base body 10 does not include the light blocking layer 18. That is, the transparent region A1 is a region in which the glass base body 12, the intermediate layer 16, and the glass base body 14 are laminated, but the light blocking layer 18 is not laminated thereon.

(Far-Infrared Ray Transmission Region)

As illustrated in FIG. 3, an opening 19 is formed on the glass 1 for vehicles, the opening 19 passing therethrough from one surface (herein, the surface 12A) to the other surface (herein, the surface 14B) in the Z-direction. A far-infrared ray transmission member 20 is disposed within the opening 19. A region in which the opening 19 is formed and the far-infrared ray transmission member 20 is disposed is the far-infrared ray transmission region B. That is, the far-infrared ray transmission region B is a region in which the opening 19 and the far-infrared ray transmission member 20 placed within the opening 19 are disposed. The light blocking layer 18 is not disposed in the far-infrared ray transmission region B. That is, in the far-infrared ray transmission region B, the glass base body 12, the intermediate layer 16, the glass base body 14, and the light blocking layer 18 are not disposed, and the far-infrared ray transmission member 20 is disposed in the formed opening 19. The far-infrared ray transmission member 20 will be described later.

(Visible Light Region)

As illustrated in FIG. 4, similarly to the transparent region A1, the visible light transmission region C is a region in which the glass base body 10 does not include the light blocking layer 18 in the Z-direction. That is, the visible light transmission region C is a region in which the glass base body 12, the intermediate layer 16, and the glass base body 14 are laminated, but the light blocking layer 18 is not laminated thereon.

As illustrated in FIG. 2, the visible light transmission region C is preferably disposed in the vicinity of the far-infrared ray transmission region B. Specifically, the center of the far-infrared ray transmission region B viewed from the Z-direction is assumed to be a center point OB, and the center of the visible light transmission region C viewed from the Z-direction is assumed to be a center point OC. Assuming that the shortest distance between the far-infrared ray transmission region B (opening 19) and the visible light transmission region C viewed from the Z-direction is a distance L, the distance L is preferably larger than 0 mm and equal to or smaller than 100 mm, and more preferably equal to or larger than 10 mm and equal to or smaller than 80 mm. By disposing the visible light transmission region C at a position in this range with respect to the far-infrared ray transmission region B, the far-infrared camera CA1 and the visible light camera CA2 are enabled to take images of near positions, and the visible light camera CA2 can appropriately take an image while suppressing an amount of perspective distortion in the visible light transmission region C. By taking images of near positions by the far-infrared camera CA1 and the visible light camera CA2, a load of performing arithmetic processing on data obtained from each camera is reduced, and a power supply or a signal cable can be preferably handled.

As illustrated in FIG. 2, the visible light transmission region C and the far-infrared ray transmission region B are preferably positioned side by side in the X-direction. That is, it is preferable that the visible light transmission region C is not positioned on the Y-direction side of the far-infrared ray transmission region B, but is positioned side by side with the far-infrared ray transmission region B in the X-direction. By placing the visible light transmission region C side by side with the far-infrared ray transmission region B in the X-direction, the visible light transmission region C can be placed in the vicinity of the upper edge part 1a. Thus, a visual field of the driver in the transparent region A1 can be appropriately secured.

(Far-Infrared Ray Transmission Member)

Figure 5:
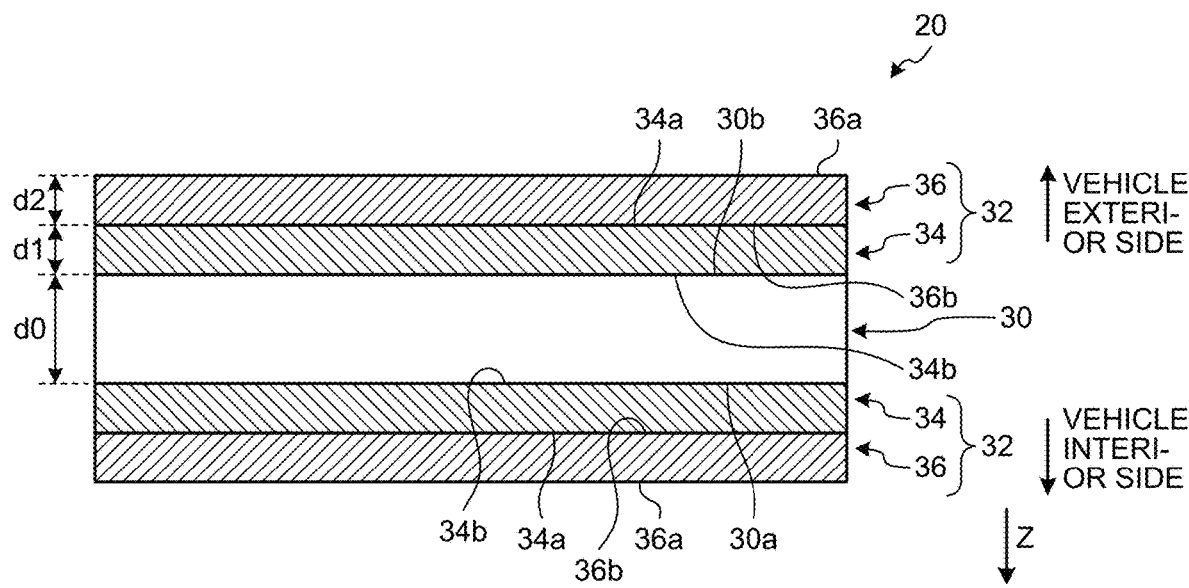
FIG. 5 is a schematic cross-sectional view of a far-infrared ray transmission member according to the present embodiment.

The following specifically describes the far-infrared ray transmission member 20 disposed in the far-infrared ray transmission region B. FIG. 5 is a schematic cross-sectional view of the far-infrared ray transmission member according to the present embodiment. As illustrated in FIG. 5, the far-infrared ray transmission member 20 includes a base material 30 and a functional film (AR film) 32 formed on the base material 30. In the present embodiment, in the far-infrared ray transmission member 20, functional films 32 are formed on both of one surface 30a and another surface 30b of the base material 30. However, in the far-infrared ray transmission member 20, the functional films 32 are not necessarily formed on both surfaces 30a and 30b of the base material 30, but the functional film 32 may be formed on at least one of the surfaces 30a and 30b. The surface 30a is a surface on the vehicle interior side in a case of being mounted on the glass 1 for vehicles, and the surface 30b is a surface on the vehicle exterior side in a case of being mounted on the glass 1 for vehicles.

As described above, in the present embodiment, the far-infrared ray transmission member 20 is disposed in the light blocking region A2 of the glass 1 for vehicles as the windshield of the vehicle V, but the embodiment is not limited thereto. The far-infrared ray transmission member 20 may be disposed on an optional exterior member of the vehicle V such as an exterior member for a pillar of the vehicle V. The far-infrared ray transmission member 20 is not necessarily disposed in the vehicle V, but may be used for any application.

(Base Material)

The base material 30 is a member capable of transmitting far-infrared rays. An internal transmittance of the base material 30 with respect to light at a wavelength of 10 μm (far-infrared rays) is preferably equal to or higher than 50%, more preferably equal to or higher than 60%, and even more preferably equal to or higher than 70%. Additionally, an average internal transmittance of the base material 30 with respect to light at a wavelength of 8 μm to 12 μm (far-infrared rays) is preferably equal to or higher than 50%, more preferably equal to or higher than 60%, and even more preferably equal to or higher than 70%. When the internal transmittance of the base material 30 with respect to 10 μm and the average internal transmittance with respect to 8 μm to 12 μm fall within this numerical range, far-infrared rays can be appropriately transmitted, and performance of the far-infrared camera CA1 can be sufficiently exhibited, for example. Herein, the average internal transmittance is an average value of the internal transmittance of light at each wavelength in the wavelength band (herein, from 8 μm to 12 μm).

The internal transmittance of the base material 30 is a transmittance excluding a surface reflection loss on an incident side and an emitting side, and is well-known in the art. The internal transmittance may be measured by using a method that is normally performed. Measurement is performed as follows, for example.

A pair of flat-plate-shaped samples (a first sample and a second sample) that are made of base materials having the same composition and have different thicknesses are prepared. Both surfaces of the flat-plate-shaped sample are assumed to be planes that are parallel with each other and optically polished. Assuming that an external transmittance including a surface reflection loss of the first sample is T1, an external transmittance including a surface reflection loss of the second sample is T2, the thickness of the first sample is Td1 (mm), and the thickness of the second sample is Td2 (mm), where Td1<Td2, an internal transmittance τ with a thickness of Tdx (mm) can be calculated by the following expression (1).

$$\tau = \exp[-Tdx \times (\ln T1 - \ln T2)/\Delta Td] \quad (1)$$

An external transmittance of infrared rays can be measured by a Fourier transform type infrared spectroscopic device (manufactured by Thermo Fisher Scientific Inc., product name: Nicolet iS10), for example.

A refractive index of the base material 30 with respect to light at a wavelength of 10 μm is preferably equal to or larger than 1.5 and equal to or smaller than 4.0, more preferably equal to or larger than 2.0 and equal to or smaller than 4.0, and even more preferably equal to or larger than 2.2 and equal to or smaller than 3.5. An average refractive index of the base material 30 with respect to light at a wavelength of 8 μm to 12 μm is preferably equal to or larger than 1.5 and equal to or smaller than 4.0, more preferably equal to or larger than 2.0 and equal to or smaller than 4.0, and even more preferably equal to or larger than 2.2 and equal to or smaller than 3.5. When the refractive index and the average refractive index of the base material 30 fall within this numerical range, far-infrared rays can be appropriately transmitted, and performance of the far-infrared camera CA1 can be sufficiently exhibited, for example. Herein, the average refractive index is an average value of the refractive index with respect to light at each wavelength in the wavelength band (herein, from 8 μm to 12 μm). The refractive index can be determined by performing fitting of an optical model using polarization information obtained by an infrared spectroscopic ellipsometer (manufactured by J.A. Woollam, IR-VASE-UT), for example, and a spectral transmission spectrum obtained by a Fourier transform type infrared spectroscopic device.

A thickness d0 of the base material 30 is preferably equal to or larger than 0.5 mm and equal to or smaller than 5 mm, more preferably equal to or larger than 1.0 mm and equal to or smaller than 4 mm, and even more preferably equal to or larger than 1.5 mm and equal to or smaller than 3 mm. When the thickness d0 falls within this range, far-infrared rays can be appropriately transmitted while securing strength. It can also be said that the thickness d0 is a length from the surface 30a to the surface 30b of the base material 30 in the Z-direction.

A material of the base material 30 is not particularly limited, but Si, Ge, ZnS, chalcogenide glass, and the like can be exemplified, for example. The base material 30 preferably includes at least one material selected from the group consisting of Si, Ge, ZnS, and chalcogenide glass. By using such a material for the base material 30, far-infrared rays can be appropriately transmitted.

Preferred composition of the chalcogenide glass contains, in atom percentage,

Ge+Ga; 7% to 25%,
Sb; 0% to 35%,
Bi; 0% to 20%,
Zn; 0% to 20%,
Sn; 0% to 20%,
Si; 0% to 20%,
La; 0% to 20%,
S+Se+Te; 55% to 80%,
Ti; 0.005% to 0.3%,
Li+Na+K+Cs; 0% to 20%, and
F+Cl+Br+I; 0% to 20%. Additionally, this glass preferably has a glass transition point (Tg) of 140° C. to 550° C.

As the material for the base material 30, it is more preferable to use Si or ZnS.

(Functional Film)

The functional film 32 is a layer that is formed on the base material 30 to suppress reflection of far-infrared rays. In the present embodiment, the functional film 32 includes a low refractive index layer 34 and a high refractive index layer 36.

In the example of FIG. 5, the low refractive index layer 34 and the high refractive index layer 36 are alternately laminated. In the example of FIG. 5, the functional film 31 is laminated on the base material 30 in order of the low refractive index layer 34 and the high refractive index layer 36 in a direction away from the base material 30. However, in the functional film 31, a layer formed to be closest to the base material 30 is not limited to the low refractive index layer 34, but may be the high refractive index layer 36, for example. For example, the high refractive index layer 36 and the low refractive index layer 34 may be laminated in this order in the direction away from the base material 30.

Figure 6:
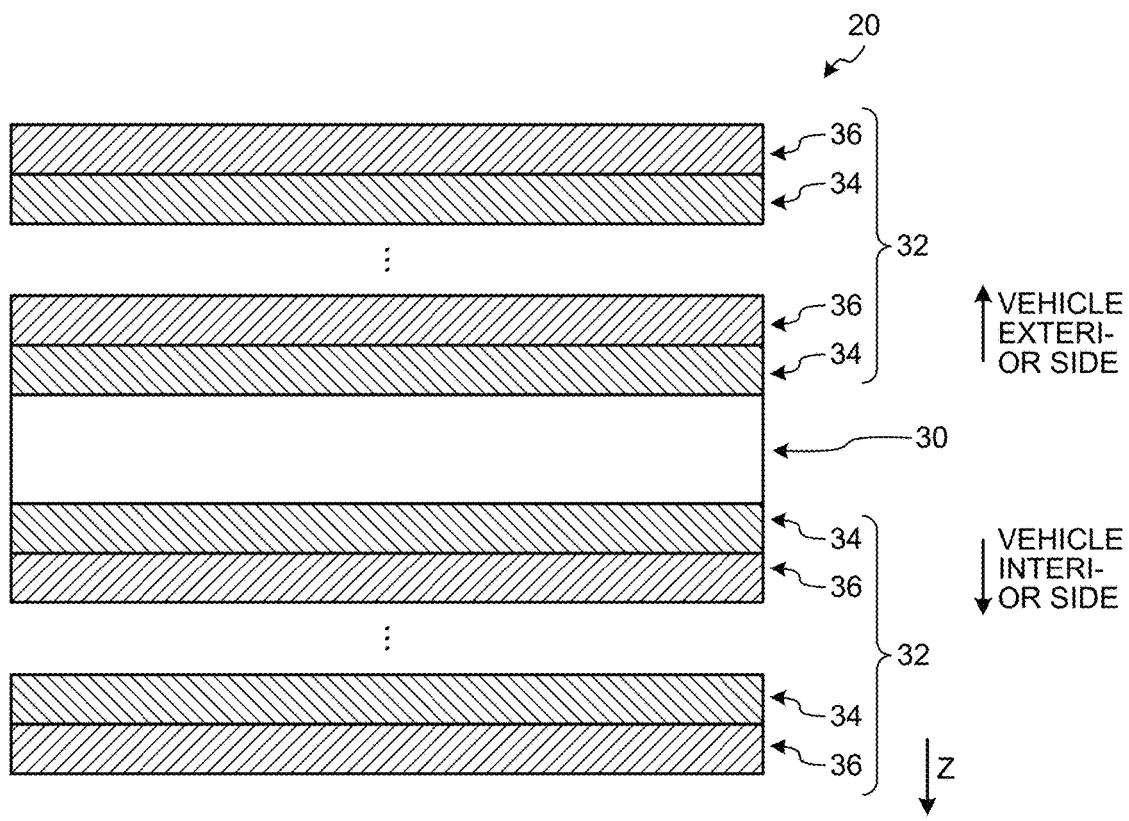
FIG. 6 is a schematic cross-sectional view of a far-infrared ray transmission member according to another example of the present embodiment.

In the example of FIG. 5, the functional film 32 has a configuration in which the one low refractive index layer 34 and the one high refractive index layer 36 are laminated, but the embodiment is not limited thereto. A plurality of the low refractive index layers 34 or a plurality of the high refractive index layers 36 may be laminated. For example, as illustrated in FIG. 6 (described later), in the far-infrared ray transmission member 20, the low refractive index layers 34 and the high refractive index layers 36 may be alternately laminated on the base material 30 in the direction away from the base material 30. That is, the base material 30, the low refractive index layer 34, the high refractive index layer 36, the low refractive index layer 34, . . . , and the high refractive index layer 36 may be laminated in this order. Furthermore, in the far-infrared ray transmission member 20, the high refractive index layers 36 and the low refractive index layers 34 may be alternately laminated on the base material 30 in the direction away from the base material 30. That is, the base material 30, the high refractive index layer 36, the low refractive index layer 34, the high refractive index layer 36, . . . , and the low refractive index layer 34 may be laminated in this order.

Figure 7:
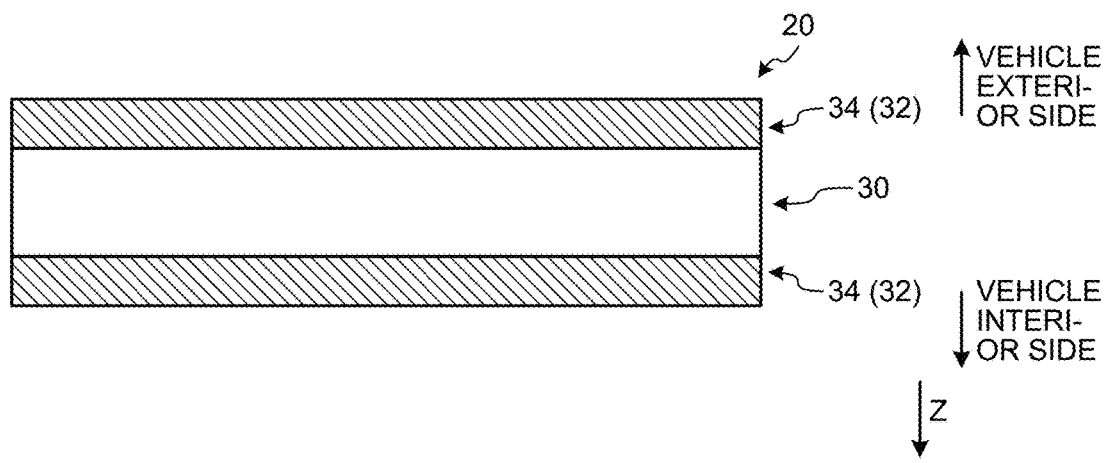
FIG. 7 is a schematic cross-sectional view of a far-infrared ray transmission member according to another example of the present embodiment.

As illustrated in FIG. 7 (described later), the functional film 32 may have a configuration including the low refractive index layer 34 but not including the high refractive index layer 36, and is characterized as including at least one low refractive index layer 34. That is, the functional film 32 may be a single layer film including the one low refractive index layer 34, and may be a multilayer film in which the low refractive index layer 34 and the high refractive index layer 36 are laminated. By causing the functional film 32 to be an antireflection film having a multilayer structure, it is possible to easily implement a low reflectance in a wide wavelength region using interferential action of light due to interface reflected light generated on each interface.

(Low Refractive Index Layer)

The low refractive index layer 34 is a film that is formed on the base material 30 to suppress reflection of far-infrared rays. The low refractive index layer 34 is a film having a low refractive index with respect to far-infrared rays. A refractive index with respect to light at a wavelength of 10 μm is preferably equal to or smaller than a square root of a refractive index of the base material 30, preferably equal to or smaller than 1.5, preferably equal to or larger than 0.8 and equal to or smaller than 1.5, and more preferably equal to or larger than 0.8 and equal to or smaller than 1.4. Furthermore, an average refractive index of the low refractive index layer 34 with respect to light at a wavelength of 8 μm to 12 μm is preferably equal to or smaller than a square root of an average refractive index of the base material 30, preferably equal to or smaller than 1.5, more preferably equal to or larger than 0.8 and equal to or smaller than 1.5, and even more preferably equal to or larger than 0.8 and equal to or smaller than 1.4. When the refractive index and the average refractive index of the low refractive index layer 34 fall within this numerical range, the low refractive index layer 34 appropriately functions as a low refractive index film, and a film thickness of the functional film 32 can be reduced while appropriately suppressing reflection of far-infrared rays.

A thickness d1 of the low refractive index layer 34 is preferably equal to or larger than 0.1 μm and equal to or smaller than 2 μm, more preferably equal to or larger than 0.2 μm and equal to or smaller than 1.7 μm, and even more preferably equal to or larger than 0.3 μm and equal to or smaller than 1.5 μm. When the thickness d1 falls within this range, the film thickness of the functional film 32 can be reduced while appropriately suppressing reflection of far-infrared rays. It can also be said that the thickness d1 is a length from a surface 34a of the low refractive index layer 34 to a surface 34b on the opposite side in the Z-direction.

Herein, it is assumed that a refractive index of the low refractive index layer 34 with respect to light at a wavelength of 10 μm is a refractive index n1, and a product of the refractive index n1 of the low refractive index layer 34 and the thickness d1 is an optical film thickness n1d1. In this case, the optical film thickness n1d1 of the low refractive index layer 34 with respect to the light at a wavelength of 10 μm is preferably equal to or larger than 0.1 μm and equal to or smaller than 2.5 μm, more preferably equal to or larger than 0.2 μm and equal to or smaller than 2.2 μm, and even more preferably equal to or larger than 0.4 μm and equal to or smaller than 2.0 μm. An average optical film thickness of the low refractive index layer 34 as a product of the thickness d1 and the average refractive index with respect to light at a wavelength of 8 μm to 12 μm is preferably equal to or larger than 0.1 μm and equal to or smaller than 2.5 μm, more preferably equal to or larger than 0.2 μm and equal to or smaller than 2.2 μm, and even more preferably equal to or larger than 0.3 μm and equal to or smaller than 2.0 μm. When the optical film thickness n1d1 and the average optical film thickness fall within this range, the film thickness of the functional film 32 can be reduced while appropriately suppressing reflection of far-infrared rays.

The low refractive index layer 34 can transmit far-infrared rays. An extinction coefficient of the low refractive index layer 34 with respect to light at a wavelength of 10 μm is preferably equal to or smaller than 0.1, more preferably equal to or smaller than 0.05, and even more preferably equal to or smaller than 0.02. An average extinction coefficient of the low refractive index layer 34 with respect to light at a wavelength of 8 μm to 12 μm is preferably equal to or smaller than 0.1, more preferably equal to or smaller than 0.05, and even more preferably equal to or smaller than 0.02. When the extinction coefficient and the average extinction coefficient fall within this range, far-infrared rays can be appropriately transmitted. The average extinction coefficient is an average value of the extinction coefficient of light at each wavelength in the wavelength band (herein, from 8 μm to 12 μm). The extinction coefficient can be determined by performing fitting of an optical model using polarization information obtained by an infrared spectroscopic ellipsometer (manufactured by J.A. Woollam, IR-VASE-UT), for example, and a spectral transmission spectrum obtained by a Fourier transform type infrared spectroscopic device.

The low refractive index layer 34 is a film containing oxide as a principal component. Herein, the principal component indicates that a content thereof with respect to the entire low refractive index layer 34 is equal to or larger than 50 mass %. More specifically, the low refractive index layer 34 preferably contains MgO as the oxide, which is the principal component. The content of MgO in the low refractive index layer 34 is preferably equal to or larger than 50 mass % and equal to or smaller than 100 mass %, more preferably equal to or larger than 70 mass % and equal to or smaller than 100 mass %, and even more preferably equal to or larger than 70 mass % and equal to or smaller than 100 mass % with respect to the entire low refractive index layer 34. In the low refractive index layer 34, the content of MgO alone, that is, excluding inevitable impurities, is preferably 100 mass %. When the content of MgO falls within this range, the low refractive index layer 34 can appropriately transmit far-infrared rays, have a low refractive index with respect to far-infrared rays, and appropriately suppress reflection of far-infrared rays.

The low refractive index layer 34 may also contain an accessory component as a component other than the oxide (herein, MgO) as the principal component. As the accessory component, oxide that transmits infrared rays is preferable, and $NiO_x$, $CuO_x$, $ZnO$, $ZrO_2$, $Bi_2O_3$, $Y_2O_3$ can be exemplified. That is, the low refractive index layer 34 preferably contains, as the accessory component, at least one material selected from the group consisting of $NiO_x$, $CuO_x$, $ZnO$, $ZrO_2$, $Bi_2O_3$, and $Y_2O_3$. MgO has deliquescency, so that there is room for improvement in view of water resistance. However, water resistance can be improved when the accessory component is contained therein. Alternatively, for example, water resistance of the functional film 32 may be improved by forming a water resistant layer on the surface of the low refractive index layer 34 containing MgO alone to protect the low refractive index layer 34. Nickel oxide and copper oxide are known to have a plurality of compositions depending on a valence of nickel and copper, and x may take an optional value from 0.5 to 2. The valence is not necessarily single, and two or more valences may be mixed. In the present embodiment, NiO is preferably used as $NiO_x$, and CuO is preferably used as $CuO_x$.

(High Refractive Index Layer)

The high refractive index layer 36 is formed on the low refractive index layer 34. That is, in the present embodiment, the low refractive index layer 34 and the high refractive index layer 36 are laminated in this order from the base material 30 side on the surface 30a on the vehicle interior side of the base material 30, and the low refractive index layer 34 and the high refractive index layer 36 are laminated in this order from the base material 30 side on the surface 30b on the vehicle exterior side of the base material 30. Hereinafter, a surface of the low refractive index layer 34 on the opposite side of the base material 30 is assumed to be the surface 34a, a surface of the low refractive index layer 34 on the base material 30 side is assumed to be the surface 34b, a surface of the high refractive index layer 36 on the opposite side of the base material 30 is assumed to be a surface 36a, and a surface of the high refractive index layer 36 on the base material 30 side is assumed to be a surface 36b. In the present embodiment, the surface 36b of the high refractive index layer 36 adheres to the surface 34a of the low refractive index layer 34, and the surface 36a on the opposite side of the surface 36b is exposed to the outside.

The refractive index of the high refractive index layer 36 with respect to light at a wavelength of 10 μm is higher than the refractive index of the low refractive index layer 34 with respect to light at a wavelength of 10 μm. The refractive index of the high refractive index layer 36 with respect to light at a wavelength of 10 μm is preferably equal to or larger than 1.5 and equal to or smaller than 4.3, more preferably equal to or larger than 1.7 and equal to or smaller than 4.3, preferably equal to or larger than 2, and more preferably equal to or larger than 2.0 and equal to or smaller than 3.8. The average refractive index of the high refractive index layer 36 with respect to light at a wavelength equal to or larger than 8 μm and equal to or smaller than 12 μm is higher than the average refractive index of the low refractive index layer 34 with respect to light at a wavelength equal to or larger than 8 μm and equal to or smaller than 12 μm. The average refractive index of the low refractive index layer 34 with respect to light at a wavelength of 8 μm to 12 μm is preferably equal to or larger than 1.5 and equal to or smaller than 4.3, more preferably equal to or larger than 1.7 and equal to or smaller than 4.3, preferably equal to or larger than 2, and more preferably equal to or larger than 2.0 and equal to or smaller than 3.8. When the refractive index and the average refractive index fall within this range, the film thickness of the functional film 32 can be reduced while appropriately suppressing reflection of far-infrared rays.

A thickness d2 of the high refractive index layer 36 is preferably equal to or larger than 0.1 μm and equal to or smaller than 2 μm, more preferably equal to or larger than 0.2 μm and equal to or smaller than 1.5 μm, and even more preferably equal to or larger than 0.3 μm and equal to or smaller than 1.2 μm. When the thickness d2 falls within this range, the film thickness of the functional film 32 can be reduced while appropriately suppressing reflection of far-infrared rays. It can also be said that the thickness d2 is a length from the surface 36a of the high refractive index layer 36 to the surface 36b on the opposite side in the Z-direction.

Herein, it is assumed that the refractive index of the high refractive index layer 36 with respect to light at a wavelength of 10 μm is a refractive index n2, and a product of the refractive index n2 of the high refractive index layer 36 and the thickness d2 is an optical film thickness n2d2. In this case, the optical film thickness n2d2 of the high refractive index layer 36 with respect to light at a wavelength of 10 μm is preferably equal to or larger than 0.2 μm and equal to or smaller than 2.5 μm, more preferably equal to or larger than 0.3 μm and equal to or smaller than 2.2 μm, and even more preferably equal to or larger than 0.3 μm and equal to or smaller than 2.0 μm. An average optical film thickness of the high refractive index layer 36 as a product of the thickness d2 and the average refractive index with respect to light at a wavelength of 8 μm to 12 μm is preferably equal to or larger than 0.2 μm and equal to or smaller than 2.5 μm, more preferably equal to or larger than 0.3 μm and equal to or smaller than 2.2 μm, and even more preferably equal to or larger than 0.3 μm and equal to or smaller than 2.0 μm. When the optical film thickness n2d2 and the average optical film thickness fall within this range, the film thickness of the functional film 32 can be reduced while appropriately suppressing reflection of far-infrared rays.

The high refractive index layer 36 can transmit far-infrared rays. An extinction coefficient of the high refractive index layer 36 with respect to light at a wavelength of 10 μm is preferably equal to or smaller than 0.1, more preferably equal to or smaller than 0.05, and even more preferably equal to or smaller than 0.02. An average extinction coefficient of the high refractive index layer 36 with respect to light at a wavelength of 8 μm to 12 μm is preferably equal to or smaller than 0.1, more preferably equal to or smaller than 0.05, and even more preferably equal to or smaller than 0.02. When the extinction coefficient and the average extinction coefficient fall within this range, far-infrared rays can be appropriately transmitted.

A material of the high refractive index layer 36 is optional, but preferably contains at least one material selected from the group consisting of Ge, Si, $NiO_x$, $CuO_x$, $Y_2O_3$, ZnS, $Bi_2O_3$, $ZrO_2$, ZnO, and diamond-like carbon, for example. By using such a material for the high refractive index layer 36, the high refractive index layer 36 can appropriately transmit far-infrared rays, have a high refractive index with respect to far-infrared rays, and appropriately suppress reflection of far-infrared rays.

The high refractive index layer 36 preferably has a water barrier property to protect the low refractive index layer 34 from water. Water barrier performance of the high refractive index layer 36 varies depending on a material, a crystal structure, and a film thickness. For example, in view of the water barrier property, the high refractive index layer 36 preferably contains at least one material selected from the group consisting of $NiO_x$, ZnS, $ZrO_2$, and diamond-like carbon. In view of the water barrier property, the high refractive index layer 36 preferably has an amorphous structure.

(Characteristic as Functional Film)

The functional film 32 is a laminated body in which the low refractive index layer 34 and the high refractive index layer 36 are laminated as described above. In the functional film 32, the low refractive index layer 34 and the high refractive index layer 36 are alternately laminated, that is, the layer of a low refractive index and the layer of a high refractive index are alternatively laminated, so that the functional film 32 can appropriately function as the AR film. More specifically, in the functional film 32, the low refractive index layer 34 of a low refractive index and the high refractive index layer 36 are laminated in this order from the base material 30 side, so that the reflectance can be appropriately lowered while reducing the film thickness.

Herein, in the functional film 32, a total optical film thickness is assumed to be a total value of an optical film thickness of one low refractive index layer 34 and an optical film thickness of one high refractive index layer 36 being in contact with the low refractive index layer 34 on the opposite side of the base material 30. That is, assuming that N is an optional positive integer, the total optical film thickness is a total value of the optical film thickness of the low refractive index layer 34 as the N-th layer and the optical film thickness of the high refractive index layer 36 as the N+1-th layer from the base material 30. In this case, the total optical film thickness is preferably equal to or smaller than ¼ of a wavelength of light as a target. That is, for example, the total optical film thickness with respect to light at 10 μm is preferably equal to or larger than 0.3 μm and equal to or smaller than 2.5 μm, more preferably equal to or larger than 0.5 μm and equal to or smaller than 2.3 μm, and even more preferably equal to or larger than 1.0 μm and equal to or smaller than 2.2 μm. When the total optical film thickness falls within this range, reflection of far-infrared rays can be appropriately suppressed. In the present embodiment, one low refractive index layer 34 and one high refractive index layer 36 are laminated in the functional film 32, so that the sum of the optical film thickness of the low refractive index layer 34 and the optical film thickness of the high refractive index layer 36 is the total optical film thickness of the functional film 32. As described later in another example, in a case in which a plurality of the low refractive index layers 34 and the high refractive index layers 36 are laminated, it is preferable that the total optical film thickness of each pair of the low refractive index layer 34 and the high refractive index layer 36 satisfies the range described above. As described later in another example, in a case in which only the low refractive index layer 34 is laminated, the optical film thickness of the low refractive index layer 34 is the total optical film thickness of the functional film 32.

In the functional film 32, an average total optical film thickness is assumed to be a total value of an average optical film thickness of one low refractive index layer 34 with respect to light at a wavelength of 8 μm to 12 μm and an average optical film thickness of one high refractive index layer 36 being in contact with the low refractive index layer 34 on the opposite side of the base material 30 with respect to light at a wavelength of 8 μm to 12 μm. In this case, the average total optical film thickness is preferably equal to or larger than 0.3 μm and equal to or smaller than 2.5 μm, more preferably equal to or larger than 0.5 μm and equal to or smaller than 2.3 μm, and even more preferably equal to or larger than 1.0 μm and equal to or smaller than 2.2 μm. When the average total optical film thickness falls within this range, reflection of far-infrared rays can be appropriately suppressed. In the present embodiment, one low refractive index layer 34 and one high refractive index layer 36 are laminated in the functional film 32, so that the sum of the optical film thickness of the low refractive index layer 34 and the average optical film thickness of the high refractive index layer 36 is the average total optical film thickness. As described later in another example, in a case in which a plurality of the low refractive index layers 34 and the high refractive index layers 36 are laminated, it is preferable that the average total optical film thickness of each pair of the low refractive index layer 34 and the high refractive index layer 36 satisfies the range described above. As described later in another example, in a case in which only the low refractive index layer 34 is laminated, the average optical film thickness of the low refractive index layer 34 is the average total optical film thickness of the functional film 32.

(Characteristic of Infrared Ray Transmission Member)

The far-infrared ray transmission member 20 is obtained by forming the functional film 32 on the surface of the base material 30 as described above. By forming the functional film 32 on the surface of the base material 30, the far-infrared ray transmission member 20 can suppress reflection of far-infrared rays, and appropriately transmit far-infrared rays.

A reflectance of the far-infrared ray transmission member 20 with respect to light at 10 μm is preferably equal to or lower than 10%, more preferably equal to or lower than 5%, and even more preferably equal to or lower than 3%. An average reflectance of the far-infrared ray transmission member 20 with respect to light at a wavelength of 8 μm to 12 μm is preferably equal to or lower than 10%, more preferably equal to or lower than 5%, and even more preferably equal to or lower than 3%. When the reflectance and the average reflectance fall within this range, a function as an infrared ray transmission member can be appropriately exhibited. The average reflectance is an average value of the reflectance with respect to light at each wavelength in the wavelength band (herein, from 8 μm to 12 μm). The reflectance can be measured by a Fourier transform type infrared spectroscopic device (manufactured by Thermo Fisher Scientific Inc., Nicolet iS10), for example.

The transmittance of the far-infrared ray transmission member 20 varies depending on the internal transmittance τ of the base material 30 to be used. The transmittance of the far-infrared ray transmission member 20 with respect to light at 10 μm is preferably equal to or higher than (τ-20)%, more preferably equal to or higher than (τ-10)%, and even more preferably equal to or higher than (τ-5)%. An average transmittance of the far-infrared ray transmission member 20 with respect to light at a wavelength of 8 μm to 12 μm is preferably equal to or higher than (τ-15)%, more preferably equal to or higher than (τ-10)%, and even more preferably equal to or higher than (τ-5)%. When the transmittance and the average transmittance fall within this range, a function as an infrared ray transmission member can be appropriately exhibited. The average transmittance is an average value of the transmittance of light at each wavelength in the wavelength band (herein, from 8 μm to 12 μm). The transmittance can be measured by a Fourier transform type infrared spectroscopic device (manufactured by Thermo Fisher Scientific Inc., Nicolet iS10), for example.

As illustrated in FIG. 3, a surface on the vehicle exterior side of the far-infrared ray transmission member 20 is preferably formed to be flush with (continuous to) a surface on the vehicle exterior side of the light blocking region A2. In other words, a surface 20A on the vehicle exterior side of the far-infrared ray transmission member 20 is attached to be continuous to the surface 12A of the glass base body 12. In this way, when the surface 20A of the far-infrared ray transmission member 20 is continuous to the surface 12A of the glass base body 12, a wiping effect of wipers can be prevented from being deteriorated. Furthermore, it is possible to prevent designability of the vehicle V from being deteriorated due to a level difference, and prevent dust and the like from accumulating on the level difference. Additionally, the far-infrared ray transmission member 20 is preferably shaped in accordance with a curved surface shape of the glass 1 for vehicles to be applied. A method for shaping the far-infrared ray transmission member 20 is not particularly limited, but polishing or mold molding is selected in accordance with a curved surface shape or a member.

The shape of the far-infrared ray transmission member 20 is not particularly limited, but may be preferably a plate shape matching the shape of the opening 19. That is, in a case in which the opening 19 has a circular shape, for example, the far-infrared ray transmission member 20 may have a disc shape (cylinder shape). In view of design, a surface shape of the far-infrared ray transmission member 20 on the vehicle exterior side may be processed to match a curvature of an outer surface shape of the glass base body 12. Furthermore, to achieve both of widening of a viewing angle of the far-infrared camera CA1 and improvement of mechanical characteristics, for example, the far-infrared ray transmission member 20 may be caused to have a lens shape. Such a configuration is preferable because far-infrared light can be efficiently collected even if the area of the far-infrared ray transmission member 20 is small. In this case, the number of far-infrared ray transmission members 20 having the lens shape is preferably 1 to 3, and typically preferably 2. Furthermore, it is particularly preferable that the far-infrared ray transmission member 20 having the lens shape is aligned and modularized in advance, and integrated with a housing for bonding the far-infrared camera CA1 to the glass 1 for vehicles, or a bracket.

The glass 1 for vehicles according to the present embodiment is preferably configured such that an area of the opening 19 on the surface on the vehicle interior side is smaller than an area of the opening 19 on the surface on the vehicle exterior side, and accordingly, an area of the surface on the vehicle interior side of the far-infrared ray transmission member 20 is preferably smaller than an area of the surface on the vehicle exterior side thereof. Such a configuration improves strength against impact from the vehicle exterior side. More specifically, in a case in which the glass 1 for vehicles according to the present embodiment is laminated glass including the glass base body 12 (vehicle exterior side) and the glass base body 14 (vehicle interior side), the opening 19 is formed by an opening 12a of the glass base body 12 and an opening 14a of the glass base body 14 overlapping each other. In this case, an area of the opening 12a of the glass base body 12 may be caused to be larger than an area of the opening 14a of the glass base body 14, and the far-infrared ray transmission member 20 matching the size of the opening 12a of the glass base body 12 may be placed in the opening 12a of the glass base body 12.

In view of strength, the thickness of the far-infrared ray transmission member 20 is preferably equal to or larger than 1.5 mm, more preferably equal to or larger than 2.0 mm, and yet more preferably equal to or larger than 3.0 mm. An upper limit of the thickness of the far-infrared ray transmission member 20 is not particularly limited, but is normally equal to or smaller than 5.0 mm. Herein, the thickness means a length of the far-infrared ray transmission member 20 in the Z-direction.

As illustrated in FIG. 3, regarding the far-infrared ray transmission member 20, a length D1 of the longest straight line among straight lines each connecting optional two points in the surface on the vehicle exterior side is preferably equal to or smaller than 80 mm. The length D1 is more preferably equal to or smaller than 70 mm, and even more preferably equal to or smaller than 65 mm. The length D1 is also preferably equal to or larger than 60 mm. As illustrated in FIG. 3, regarding the opening 19 in the far-infrared ray transmission region B, a length D2 of the longest straight line among straight lines each connecting optional two points in the surface on the vehicle exterior side is preferably equal to or smaller than 80 mm. The length D2 is more preferably equal to or smaller than 70 mm, and even more preferably equal to or smaller than 65 mm. The length D2 is also preferably equal to or larger than 60 mm. It can also be said that the length D2 is the length of the longest straight line among straight lines each connecting optional two points on an outer circumference of the opening 19 on the surface on the vehicle exterior side (surface 12A) of the glass 1 for vehicles. By causing the length D1 of the far-infrared ray transmission member 20 and the length D2 of the opening 19 to fall within this range, the strength of the glass 1 for vehicles can be prevented from being reduced, and the amount of perspective distortion in the periphery of the opening 19 can be suppressed. Each of the lengths D1 and D2 is a length corresponding to a diameter of the surface on the vehicle exterior side in a case in which the surface on the vehicle exterior side of the far-infrared ray transmission member 20 has a circular shape. Herein, each of the lengths D1 and D2 indicates a length in a state in which the glass 1 for vehicles is mounted on the vehicle V. For example, in a case of performing bending processing on the glass to have a shape to be mounted on the vehicle V, each of the lengths D1 and D2 is a length in a state after the bending processing is performed. The same applies to the description about dimensions and positions other than the lengths D1 and D2 unless otherwise noted.

(Method for Manufacturing Infrared Ray Transmission Member)

Next, the following describes a method for manufacturing the far-infrared ray transmission member 20. In manufacturing the far-infrared ray transmission member 20, the base material 30 is prepared, and the low refractive index layer 34 is formed on the surface of the base material 30. In the present embodiment, the low refractive index layer 34 is formed on the surface of the base material 30 by sputtering. The high refractive index layer 36 is then formed, by sputtering, on the surface of the low refractive index layer 34 formed on the base material 30. In this way, the far-infrared ray transmission member 20 is manufactured. By forming the low refractive index layer 34 and the high refractive index layer 36 by sputtering, adhesion of the film can be improved. However, the method for manufacturing the far-infrared ray transmission member 20 is not limited thereto. For example, the low refractive index layer 34 and the high refractive index layer 36 are not necessarily formed by sputtering, but may be formed by vapor deposition, for example. The low refractive index layer 34 contains oxide as a principal component, so that a forming method therefor is not limited to vapor deposition like fluoride, for example, and the low refractive index layer 34 can be formed by various methods. Specifically, by forming the low refractive index layer 34 by sputtering, productivity and adhesion of the film can be improved.

(Other Examples of Present Embodiment)

In the present embodiment, the functional film 32 has a configuration in which one low refractive index layer 34 and one high refractive index layer 36 are laminated, but the embodiment is not limited thereto. The following describes other lamination examples of the functional film 32.

FIG. 6 is a schematic cross-sectional view of the far-infrared ray transmission member according to another example of the present embodiment. As illustrated in FIG. 6, in the functional film 32, a plurality of the low refractive index layers 34 and the high refractive index layers 36 may be laminated. In this case, in the functional film 32, the low refractive index layers 34 and the high refractive index layers 36 are alternately laminated in order of the low refractive index layer 34, the high refractive index layer 36, the low refractive index layer 34, . . . from the base material 30 side, and the high refractive index layer 36 is formed on the surface of the functional film 32 on the opposite side of the base material 30. In other words, in the functional film 32, the low refractive index layers 34 and the high refractive index layers 36 are alternately laminated so that the low refractive index layer 34 is disposed to be closest to the base material 30, and the high refractive index layer 36 is disposed to be farthest from and on the opposite side of the base material 30. In this way, by laminating the low refractive index layers 34 and the high refractive index layers 36, the reflectance of light in a wider wavelength range can be suppressed.

As illustrated in FIG. 6, in a case in which the low refractive index layers 34 and the high refractive index layers 36 are laminated, the low refractive index layers 34 may be preferably made of the same material. On the other hand, the high refractive index layers 36 are not necessarily made of the same material, and a film having good durability can be selected as an outermost layer. For example, a high hardness film having durability against wiper wiping such as diamond-like carbon can be placed as the outermost layer, or a film made of a material having a good water barrier property as described above can be placed as the outermost layer.

FIG. 7 is a schematic cross-sectional view of the far-infrared ray transmission member according to another example of the present embodiment. As illustrated in FIG. 7, the functional film 32 may be formed of only the low refractive index layer 34 without the high refractive index layer 36.

MgO has deliquescency, so that, in a case of forming the functional film 32 only with the low refractive index layer 34, the low refractive index layer 34 preferably contains an accessory component for improving water resistance. As described above, the accessory component herein preferably contains at least one material selected from the group consisting of $NiO_x$, $CuO_x$, $ZnO$, $ZrO_2$, $Bi_2O_3$, and $Y_2O_3$.

Figure 8:
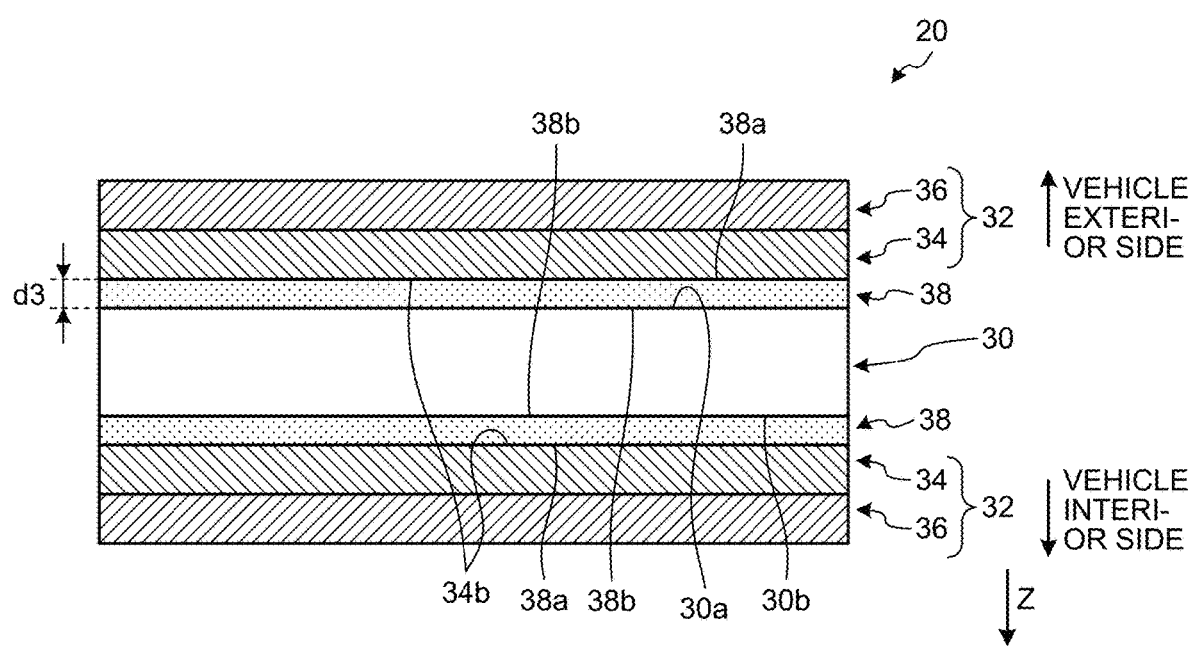
FIG. 8 is a schematic cross-sectional view of a far-infrared ray transmission member according to another example of the present embodiment.

FIG. 8 is a schematic cross-sectional view of the far-infrared ray transmission member according to another example of the present embodiment. As illustrated in FIG. 8, in the far-infrared ray transmission member 20, an adhesive film 38 is formed between the base material 30 and the functional film 32, in other words, between the base material 30 and the low refractive index layer 34. That is, the low refractive index layer 34 and the base material 30 directly adhere to each other in the embodiment described above, but the low refractive index layer 34 and the base material 30 may be joined via the adhesive film 38 as in this example. In the example of FIG. 8, for convenience of explanation, one low refractive index layer 34 and one high refractive index layer 36 are laminated in the functional film 32, but the embodiment is not limited thereto. Any of the lamination configurations described above may be employed.

(Adhesive Film)

The adhesive film 38 is a film for causing the base material 30 and the low refractive index layer 34 to adhere to each other, in other words, a film for improving adhesive strength between the base material 30 and the low refractive index layer 34.

A refractive index of the adhesive film 38 with respect to light at a wavelength of 10 μm is preferably equal to or larger than 1.0 and equal to or smaller than 4.3, more preferably equal to or larger than 1.5 and equal to or smaller than 4.3, and even more preferably equal to or larger than 1.5 and equal to or smaller than 3.8. An average refractive index of the adhesive film 38 with respect to light at a wavelength of 8 μm to 12 μm is preferably equal to or larger than 1.0 and equal to or smaller than 4.3, more preferably equal to or larger than 1.5 and equal to or smaller than 4.3, and even more preferably equal to or larger than 1.5 and equal to or smaller than 3.8. When the refractive index and the average refractive index fall within this range, reflection of far-infrared rays can be appropriately suppressed.

A thickness d3 of the adhesive film 38 is preferably equal to or larger than 0.05 μm and equal to or smaller than 0.5 μm, more preferably equal to or larger than 0.05 μm and equal to or smaller than 0.3 μm, and even more preferably equal to or larger than 0.05 μm and equal to or smaller than 0.1 μm. When the thickness d3 falls within this range, it is possible to cause the base material 30 and the low refractive index layer 34 to adhere to each other while appropriately suppressing reflection of far-infrared rays. It can also be said that the thickness d3 is a length from a surface 38a of the adhesive film 38 to a surface 38b on the opposite side in the Z-direction. The thickness d3 of the adhesive film 38 is preferably smaller than the thickness d1 of the low refractive index layer 34 and the thickness d2 of the high refractive index layer 36. Due to the thickness d3 of the adhesive film 38 smaller than the thicknesses of these layers, influence on optical performance can be reduced.

The adhesive film 38 can transmit far-infrared rays. An extinction coefficient of the adhesive film 38 with respect to light at a wavelength of 10 µm is preferably equal to or smaller than 0.4, more preferably equal to or smaller than 0.2, and even more preferably equal to or smaller than 0.1. An average extinction coefficient of the adhesive film 38 with respect to light at a wavelength of 8 µm to 12 µm is preferably equal to or smaller than 0.4, more preferably equal to or smaller than 0.2, and even more preferably equal to or smaller than 0.1. When the extinction coefficient and the average extinction coefficient fall within this range, far-infrared rays can be appropriately transmitted.

A material of the adhesive film 38 is optional, but preferably contains at least one material selected from the group consisting of Si, Ge, MgO, $NiO_x$, $CuO_x$, ZnS, $Al_2O_3$, $ZrO_2$, $SiO_2$, $TiO_2$, ZnO, and $Bi_2O_3$, for example. By using such a material, the adhesive film 38 can cause the base material 30 and the low refractive index layer 34 to appropriately adhere to each other.

Similarly to the low refractive index layer 34, the adhesive film 38 may also be formed by sputtering, but the embodiment is not limited thereto. The adhesive film 38 may be formed by vapor deposition, for example.

Figure 9:
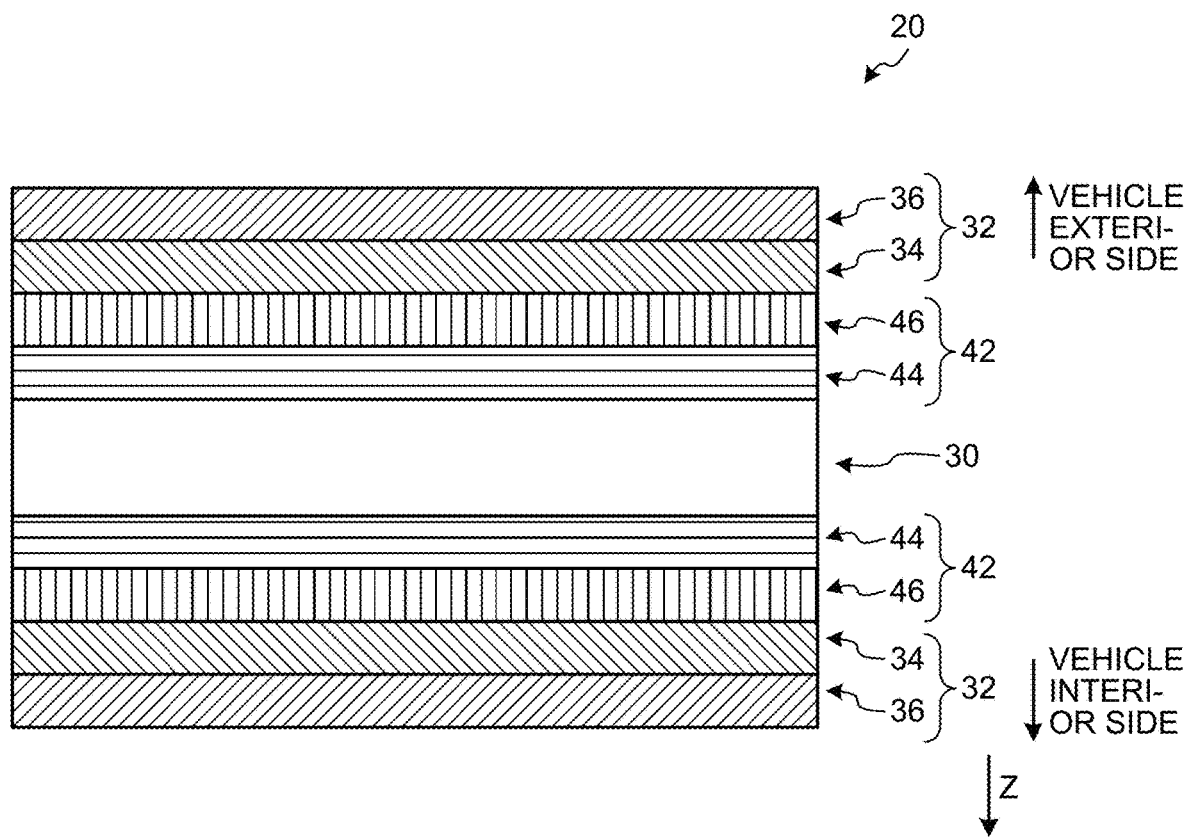
FIG. 9 is a schematic cross-sectional view of a far-infrared ray transmission member according to another example of the present embodiment.

FIG. 9 is a schematic cross-sectional view of the far-infrared ray transmission member according to another example of the present embodiment. As illustrated in FIG. 9, in the far-infrared ray transmission member 20, a transmission band forming film 42 is formed between the base material 30 and the functional film 32, in other words, between the base material 30 and the low refractive index layer 34. That is, only the functional film 32 is formed on the base material 30 in the embodiment described above, but the transmission band forming film 42 may be disposed between the low refractive index layer 34 and the base material 30 as in this example. In the example of FIG. 9, for convenience of explanation, one low refractive index layer 34 and one high refractive index layer 36 are laminated in the functional film 32, but the embodiment is not limited thereto. Any of the lamination configurations described above may be employed.

The transmission band forming film 42 has a role of widening a transmission wavelength region and forming band-pass. As illustrated in FIG. 9, the transmission band forming film 42 includes an intermediate refractive index layer 44 and a high refractive index layer 46.

In the example of FIG. 9, the intermediate refractive index layer 44 and the high refractive index layer 46 are alternately laminated. In the example of FIG. 9, the transmission band forming film 42 is laminated on the base material 30 in order of the intermediate refractive index layer 44 and the high refractive index layer 46 in a direction away from the base material 30. However, in the transmission band forming film 42, a layer formed to be closest to the base material 30 is not limited to the intermediate refractive index layer 44, but may be the high refractive index layer 46, for example. For example, the high refractive index layer 46 and the intermediate refractive index layer 44 may be laminated in this order in the direction away from the base material 30.

In the example of FIG. 9, the transmission band forming film 42 has a configuration in which one intermediate refractive index layer 44 and one high refractive index layer 46 are laminated, but the embodiment is not limited thereto. A plurality of the intermediate refractive index layers 44 or a plurality of the high refractive index layers 46 may be laminated. For example, in the transmission band forming film 42, the intermediate refractive index layers 44 and the high refractive index layers 46 may be alternately laminated on the base material 30 in the direction away from the base material 30. That is, the base material 30, the intermediate refractive index layer 44, the high refractive index layer 46, the intermediate refractive index layer 44, . . . , and the high refractive index layer 46 may be laminated in this order. Furthermore, in the far-infrared ray transmission member 20, the high refractive index layers 46 and the intermediate refractive index layers 44 may be alternately laminated on the base material 30 in the direction away from the base material 30. That is, the base material 30, the high refractive index layer 46, the intermediate refractive index layer 44, the high refractive index layer 46, . . . , and the intermediate refractive index layer 44 may be laminated in this order.

The transmission band forming film 42 may have a configuration including the high refractive index layer 46 but not including the intermediate refractive index layer 44, and is characterized as including at least one high refractive index layer 46. That is, the transmission band forming film 42 may be a single layer film including one high refractive index layer 46, and may be a multilayer film in which the high refractive index layer 46 and the intermediate refractive index layer 44 are laminated.

The high refractive index layer 46 is a layer having a higher refractive index with respect to light of far-infrared rays than that of the low refractive index layer 34 of the functional film 32. A characteristic and a material of the high refractive index layer 46 may be the same as those of the high refractive index layer 36 of the functional film 32, so that detailed description thereof will not be repeated.

(Intermediate Refractive Index Layer)

A refractive index of the intermediate refractive index layer 44 with respect to light at a wavelength of 10 µm is higher than the refractive index of the low refractive index layer 34 with respect to light at a wavelength of 10 µm, and lower than the refractive index of each of the high refractive index layers 36 and 46 with respect to light at a wavelength of 10 µm. The refractive index of the intermediate refractive index layer 44 with respect to light at a wavelength of 10 µm is preferably equal to or larger than 1.5 and equal to or smaller than 3.5, more preferably equal to or larger than 1.7 and equal to or smaller than 3.0, and even more preferably equal to or larger than 2.0 and equal to or smaller than 2.5. An average refractive index of the intermediate refractive index layer 44 with respect to light at a wavelength equal to or larger than 8 µm and equal to or smaller than 12 µm is higher than the average refractive index of the low refractive index layer 34 with respect to light at a wavelength equal to or larger than 8 µm and equal to or smaller than 12 µm, and lower than the average refractive index of each of the high refractive index layers 36 and 46 with respect to light at a wavelength equal to or larger than 8 µm and equal to or smaller than 12 µm. The average refractive index of the intermediate refractive index layer 44 with respect to light at a wavelength of 8 µm to 12 µm is preferably equal to or larger than 1.5 and equal to or smaller than 3.5, more preferably equal to or larger than 1.7 and equal to or smaller than 3.0, and even more preferably equal to or larger than 2.0 and equal to or smaller than 2.5. When the refractive index and the average refractive index fall within this range, the intermediate refractive index layer 44 can appropriately function as an optical band-pass filter by being laminated with the high refractive index layer 46.

The thickness of the intermediate refractive index layer 44 is preferably equal to or larger than 0.1 µm and equal to or smaller than 2.5 µm, more preferably equal to or larger than 0.2 µm and equal to or smaller than 2.2 m, and even more preferably equal to or larger than 0.3 µm and equal to or smaller than 2.0 μm. When the thickness of the intermediate refractive index layer 44 falls within this range, the intermediate refractive index layer 44 can appropriately function as an optical band-pass filter by being laminated with the high refractive index layer 46.

The intermediate refractive index layer 44 can transmit far-infrared rays. An extinction coefficient of the intermediate refractive index layer 44 with respect to light at a wavelength of 10 μm is preferably equal to or smaller than 0.1, more preferably equal to or smaller than 0.05, and even more preferably equal to or smaller than 0.02. An average extinction coefficient of the intermediate refractive index layer 44 with respect to light at a wavelength of 8 μm to 12 μm is preferably equal to or smaller than 0.1, more preferably equal to or smaller than 0.05, and even more preferably equal to or smaller than 0.02. When the extinction coefficient and the average extinction coefficient fall within this range, the intermediate refractive index layer 44 can appropriately function as an optical band-pass filter by being laminated with the high refractive index layer 46.

A material of the intermediate refractive index layer 44 is optional, but preferably contains at least one material selected from the group consisting of ZnS, $NiO_x$, $CuO_x$, $Y_2O_3$, $Bi_2O_3$, $ZrO_2$, ZnO, and diamond-like carbon, for example. By using such a material, the intermediate refractive index layer 44 can appropriately function as an optical band-pass filter by being laminated with the high refractive index layer 46.

(Effects)

As described above, the far-infrared ray transmission member 20 according to the present embodiment includes the base material 30 that transmits far-infrared rays, and the functional film 32 being formed on the base material 30 and including the low refractive index layer 34 that contains oxide as a principal component and has the refractive index equal to or smaller than 1.5 with respect to light at a wavelength of 10 μm. The low refractive index layer 34 contains MgO as a principal component, and the content of MgO is equal to or larger than 50 mass % and equal to or smaller than 100 mass % with respect to the entire low refractive index layer 34. By including the low refractive index layer 34 that contains MgO as a principal component and has a low refractive index with respect to light at a wavelength of 10 μm, the far-infrared ray transmission member 20 can give appropriate antireflection performance while reducing the film thickness of the low refractive index layer 34. The low refractive index layer 34 contains MgO as a principal component, so that adhesion can be improved, or the number of options of a forming process can be increased. Thus, with this far-infrared ray transmission member 20, reflection of far-infrared rays can be appropriately suppressed, and an antireflection film can be appropriately formed. Additionally, by causing the low refractive index layer 34 to contain MgO as a principal component, it is possible to appropriately provide a film that is transparent to far-infrared rays and has a low refractive index.

The average refractive index of the low refractive index layer 34 with respect to light at a wavelength of 8 μm to 12 μm is preferably equal to or larger than 0.8 and equal to or smaller than 1.5. Thus, the far-infrared ray transmission member 20 can give appropriate antireflection performance while reducing the film thickness of the low refractive index layer 34.

The optical film thickness n1d1 of the low refractive index layer 34 as a product of the thickness d1 and the refractive index n1 with respect to light at a wavelength of 10 μm is preferably equal to or larger than 0.1 μm and equal to or smaller than 2.5 μm. Thus, the far-infrared ray transmission member 20 can give appropriate antireflection performance while reducing the film thickness of the low refractive index layer 34.

The extinction coefficient of the low refractive index layer 34 with respect to light at a wavelength of 10 μm is preferably equal to or smaller than 0.1. When the extinction coefficient of the low refractive index layer 34 falls within this range, the far-infrared ray transmission member 20 can appropriately transmit far-infrared rays.

The reflectance of the far-infrared ray transmission member 20 with respect to light at a wavelength of 10 μm is preferably equal to or lower than 10%. With the far-infrared ray transmission member 20, far-infrared rays can be appropriately transmitted.

The average reflectance of the far-infrared ray transmission member 20 with respect to light at a wavelength of 8 μm to 12 μm is preferably equal to or lower than 10%. With the far-infrared ray transmission member 20, far-infrared rays can be appropriately transmitted.

The far-infrared ray transmission member 20 preferably further includes the high refractive index layer 36 that is formed on the opposite side of the base material 30 side of the low refractive index layer 34 and has a higher refractive index with respect to light at a wavelength of 10 μm than that of the low refractive index layer 34. With this far-infrared ray transmission member 20, by laminating the high refractive index layer 36 on the low refractive index layer 34, the reflectance can be appropriately lowered while reducing the film thickness.

The refractive index of the high refractive index layer 36 with respect to light at a wavelength of 10 μm is preferably equal to or larger than 2. With this far-infrared ray transmission member 20, by laminating the high refractive index layer 36 on the low refractive index layer 34, the reflectance can be appropriately lowered while reducing the film thickness.

The total value (total optical film thickness) of the optical film thickness n1d1 of the low refractive index layer 34 as a product of the thickness d1 and the refractive index n1 with respect to light at a wavelength of 10 μm and the optical film thickness n2d2 of the high refractive index layer 36 being in contact with the low refractive index layer 34 on the opposite side of the base material 30 as a product of the thickness d2 and the refractive index n2 with respect to light at a wavelength of 10 μm is preferably equal to or larger than 0.1 μm and equal to or smaller than 2.5 μm. By causing the total optical film thickness to fall within this range, the reflectance can be appropriately lowered while reducing the film thickness.

The high refractive index layer 36 preferably contains at least one material selected from the group consisting of Ge, Si, $NiO_x$, $CuO_x$, $Y_2O_3$, ZnS, $Bi_2O_3$, $ZrO_2$, ZnO, and diamond-like carbon. By using such a material as the high refractive index layer 36, the reflectance can be appropriately lowered.

In the far-infrared ray transmission member 20, the adhesive film 38 for causing the base material 30 and the low refractive index layer 34 to adhere to each other may be formed between the base material 30 and the low refractive index layer 34. By disposing the adhesive film 38, the low refractive index layer 34 can be appropriately joined to the base material 30.

The adhesive film 38 preferably contains at least one material selected from the group consisting of Si, Ge, MgO, $NiO_x$, $CuO_x$, ZnS, $Al_2O_3$, $ZrO_2$, $SiO_2$, $TiO_2$, ZnO, and Bi₂O₃. By using such a material for the adhesive film 38, the low refractive index layer 34 can be appropriately joined to the base material 30.

The base material 30 preferably contains at least one material selected from the group consisting of Si, Ge, ZnS, and chalcogenide glass. By using such a material for the base material 30, far-infrared rays can be appropriately transmitted.

The far-infrared ray transmission member 20 is preferably mounted on the vehicle. By mounting the far-infrared ray transmission member 20 on the vehicle, performance of the far-infrared camera CA1 for the vehicle can be sufficiently exhibited.

In the method for manufacturing the far-infrared ray transmission member 20 according to the present embodiment, the far-infrared ray transmission member 20 is manufactured by forming the functional film 32 on the base material 30 that transmits far-infrared rays, the functional film 32 including the low refractive index layer 34 that contains oxide as a principal component and has a refractive index equal to or smaller than 1.5 with respect to light at a wavelength of 10 μm. According to this manufacturing method, it is possible to manufacture the far-infrared ray transmission member 20 that can appropriately suppress reflection of far-infrared rays, and to appropriately form an antireflection film.

In this manufacturing method, the low refractive index layer 34 is preferably formed by sputtering. By using sputtering, productivity of the low refractive index layer 34 and adhesion of the film can be improved.

EXAMPLES

The following specifically describes the present invention using examples, but the present invention is not limited thereto. Table 1 to Table 3 indicate the examples. In Table 1 to Table 3, a unit of the thickness and the total optical film thickness is nm.

TABLE 1

| | | | Film configuration | | | | Evaluation | | | | |
| | | | Functional film | | | | Optical performance | | | | |
| | Base material | | First layer | Second layer | Third layer | Fourth layer | Average transmittance | Average reflectance | Evaluation result | Adhesion performance | Boiling test |
|---|---|---|---|---|---|---|---|---|---|---|---|
| Example 1 | ZnS | Film type | MgO | NiOx | — | — | 92.1 | 2.8 | ○ | ○ | ○ |
| | | Thickness | 830 | 300 | — | — | | | | | |
| | | Refractive index | 1.30 | 2.13 | — | — | | | | | |
| | | Total optical film thickness | 1718 | | — | | | | | | |
| Example 2 | ZnS | Film type | MgO | Si | — | — | 93.7 | 2.1 | ○ | ○ | x |
| | | Thickness | 920 | 130 | — | — | | | | | |
| | | Refractive index | 1.30 | 3.79 | — | — | | | | | |
| | | Total optical film thickness | 1689 | | — | | | | | | |
| Example 3 | ZnS | Film type | MgO | DLC | — | — | 90.5 | 2.0 | ○ | ○ | ○ |
| | | Thickness | 1040 | 220 | — | — | | | | | |
| | | Refractive index | 1.30 | 2.2 | — | — | | | | | |
| | | Total optical film thickness | 1836 | | — | | | | | | |
| Example 4 | ZnS | Film type | Ge | ZnS | — | — | 85.2 | 11.9 | x | x | x |
| | | Thickness | 965 | 830 | — | — | | | | | |
| | | Refractive index | 4.00 | 2.14 | — | — | | | | | |
| | | Total optical film thickness | 5636 | | — | | | | | | |
| Example 5 | ZnS | Film type | MgF₂ | ZnS | — | — | 94.2 | 2.8 | ○ | x | x |
| | | Thickness | 1000 | 300 | — | — | | | | | |
| | | Refractive index | 1.11 | 2.14 | — | — | | | | | |
| | | Total optical film thickness | 1752 | | — | | | | | | |
| Example 6 | ZnS | Film type | MgO | ZnS | MgO | DLC | 91.7 | 1.0 | ○ | ○ | ○ |
| | | Thickness | 300 | 680 | 1300 | 150 | | | | | |
| | | Refractive index | 1.30 | 2.14 | 1.30 | 2.2 | | | | | |
| | | Total optical film thickness | 1845 | | 2020 | | | | | | |
| Example 7 | Si | Film type | MgO | NiOx | — | — | 73.5 | 4.1 | ○ | ○ | ○ |
| | | Thickness | 450 | 630 | — | — | | | | | |
| | | Refractive index | 1.30 | 2.13 | — | — | | | | | |
| | | Total optical film thickness | 1927 | | — | | | | | | |
| Example 8 | ZnS | Film type | — | — | — | — | 72.3 | 23.3 | x | ○ | ○ |
| | | Thickness | — | — | — | — | | | | | |
| | | Refractive index | — | — | — | — | | | | | |
| | | Total optical film thickness | — | | — | | | | | | |
| Example 9 | Si | Film type | — | — | — | — | 42.5 | 39.3 | x | ○ | ○ |
| | | Thickness | — | — | — | — | | | | | |
| | | Refractive index | — | — | — | — | | | | | |
| | | Total optical film thickness | — | | — | | | | | | |

TABLE 1-continued

| | Base material | | Functional film | | | | Evaluation | | | | |
| | | | First layer | Second layer | Third layer | Fourth layer | Average transmittance | Average reflectance | Evaluation result | Adhesion performance | Boiling test |
|---|---|---|---|---|---|---|---|---|---|---|---|
| Example 10 | ZnS | Film type | MgO | — | — | — | 88.2 | 6.9 | ○ | ○ | x |
| | | Thickness | 1640 | — | — | — | | | | | |
| | | Refractive index | 1.3 | — | — | — | | | | | |
| | | Total optical film thickness | 2132 | | — | | | | | | |
| Example 11 | ZnS | Film type | MgO + NiOx | — | — | — | 89.6 | 3.4 | ○ | ○ | ○ |
| | | Thickness | 1500 | — | — | — | | | | | |
| | | Refractive index | 1.49 | — | — | — | | | | | |
| | | Total optical film thickness | 2235 | | — | | | | | | |

TABLE 2

| | Base material | | Functional film | | | Evaluation | | | | |
| | | | Adhesive layer | First layer | Second layer | Average transmittance | Average reflectance | Evaluation result | Adhesive performance | Boiling test |
|---|---|---|---|---|---|---|---|---|---|---|
| Example 12 | ZnS | Film type | Si | MgO | NiOx | 91.4 | 2.9 | ○ | ○ | ○ |
| | | Thickness | 80 | 1100 | 330 | | | | | |
| | | Refractive index | 3.79 | 1.30 | 2.13 | | | | | |
| | | Total optical film thickness | — | 2133 | | | | | | |

TABLE 3

| | Base material | | Transmission band forming film | | | | | | Functional film | | Evaluation | | |
| | | | First layer | Second layer | Third layer | Fourth layer | Fifth layer | Sixth layer | First layer | Second layer | Average transmittance | Average reflectance | Evaluation result |
|---|---|---|---|---|---|---|---|---|---|---|---|---|---|
| Example 13 | ZnS | Film type | Ge | ZnS | Ge | ZnS | Ge | ZnS | MgO | ZnS | 95.9 | 0.5 | ○ |
| | | Thickness | 120 | 480 | 680 | 130 | 380 | 200 | 560 | 500 | | | |
| | | Refractive index | 4 | 2.14 | 4 | 2.14 | 4 | 2.14 | 1.30 | 2.14 | | | |
| | | Total optical film thickness | | | | | | | 1798 | | | | |

Example 1

In an example 1, functional films were respectively formed on both surfaces of a base material by a magnetron sputtering method, and a far-infrared ray transmission member was obtained. In the example 1, ZnS (multi-grade) was used as the base material. The thickness of the base material was 2 mm±0.1 mm. The thickness was measured by digital calipers (manufactured by Mitutoyo Corporation, CD-15CX). As the functional films, MgO was used as a low refractive index layer, and $NiO_x$ was used as a high refractive index layer. The thickness $d1$ and the refractive index $n1$ of the low refractive index layer and the thickness $d2$ and the refractive index $n2$ of the high refractive index layer are indicated in Table 1. Herein, the refractive index is a refractive index with respect to light at 10 μm. The total optical film thickness is indicated in Table 1, the total optical film thickness calculated as the sum of the optical film thickness $n1d1$ as the product of the refractive index $n1$ and the thickness $d1$ of the low refractive index layer and the optical film thickness $n2d2$ as the product of the refractive index $n2$ and the thickness $d2$ of the high refractive index layer. The thickness and the refractive index were determined by performing fitting of an optical model using polarization information obtained by an infrared spectroscopic ellipsometer and a spectral transmission spectrum obtained by a Fourier transform type infrared spectroscopic device.

In the example 1, first, an Mg target as a film forming raw material and the base material were placed to be opposed to each other on a magnetron sputtering device. Next, the entire device was evacuated to be vacuum. At the time when a pressure inside the device reached 5×10E-4 Pa, 300 SCCM (standard cc/min, 1 atm (25° C.)) of Ar gas and oxygen gas in total were made flow. An evacuation speed was adjusted so that the pressure inside the device became 0.5 Pa at this point. Thereafter, 2000 W of DC pulse current (20 kHz) was applied to a target surface, and MgO was deposited on the surface of the base material.

Subsequently, an $NiO_x$ target as a film forming raw material and the base material were placed to be opposed to each other. 300 SCCM of Ar gas and oxygen gas in total were made flow. The evacuation speed was adjusted so that the pressure inside the device became 0.5 Pa at this point. Thereafter, 3000 W of DC pulse current (20 kHz) was applied to a target surface, and $NiO_x$ was deposited on the surface of the base material.

Example 2

In an example 2, the functional films were respectively formed on both surfaces of the base material by a magnetron sputtering method, and the far-infrared ray transmission member was obtained. The far-infrared ray transmission member was prepared by using the same method as that in the example 1 except that the material of the high refractive index layer was Si, deposition was performed by using an Si target as a film forming raw material, gas used at the time of deposition was only Ar gas, and thicknesses of the low refractive index layer and the high refractive index layer indicated in Table 1 were used.

Example 3

In an example 3, the functional films were respectively formed on both surfaces of the base material by using a vapor deposition method and a plasma CVD method, and the far-infrared ray transmission member was obtained. The far-infrared ray transmission member was prepared by using the same method as that in the example 1 except that the material of the high refractive index layer is diamond-like carbon (DLC), the thicknesses of the low refractive index layer and the high refractive index layer indicated in Table 1 were used, MgO is formed by using a vapor deposition method, and a film of diamond-like carbon (DLC) was formed by using a plasma CVD method.

Example 4

In an example 4, the functional films were respectively formed on both surfaces of the base material by using a vapor deposition method, and the far-infrared ray transmission member was obtained. The functional films were constituted of Ge and ZnS as high refractive index layers, and the low refractive index layer was not used. The far-infrared ray transmission member was prepared by using the same method as that in the example 1 except that the thicknesses of the functional films indicated in Table 1 were used.

Example 5

In an example 5, the functional films were respectively formed on both surfaces of the base material by using the vapor deposition method, and the far-infrared ray transmission member was obtained. The far-infrared ray transmission member was prepared by using the same method as that in the example 4 except that a material of the first layer was $MgF_2$, a material of the high refractive index layer as the second layer was ZnS, the thicknesses of the functional films indicated in Table 1 were used, and the first layer was formed by vapor deposition.

Example 6

In an example 6, the functional films were respectively formed on both surfaces of the base material by using a vapor deposition method and a plasma CVD method, and the far-infrared ray transmission member was obtained. The far-infrared ray transmission member was prepared by using the same method as that in the example 3 and the example 4 except that the material of the low refractive index layer was MgO, the material of the high refractive index layer was ZnS and diamond-like carbon (DLC), and the thicknesses of the low refractive index layer and the high refractive index layer indicated in Table 1 were used.

Example 7

In an example 7, the functional films were respectively formed on both surfaces of the base material by a magnetron sputtering method, and the far-infrared ray transmission member was obtained. The far-infrared ray transmission member was prepared by using the same method as that in the example 1 except that Si (FZ grade) having a thickness of 2 mm±0.1 mm was used as the base material, the material of the low refractive index layer was MgO, the material of the high refractive index layer was $NiO_x$, and the thicknesses of the low refractive index layer and the high refractive index layer indicated in Table 1 were used.

Example 8

In an example 8, the functional film was not formed, and the base material was prepared by using ZnS as a material.

Example 9

In an example 9, the functional film was not formed, and the base material was prepared by using Si as a material.

Example 10

In an example 10, only MgO as the low refractive index layers was formed as the functional films on both surfaces of the base material by using a magnetron sputtering method, and the far-infrared ray transmission member was obtained. The far-infrared ray transmission member was prepared by using the same method as that in the example 1 except that MgO was formed by using a sputtering device different from that in the example 1, 15 SCCM of Ar gas and oxygen gas in total was used, 400 W of DC pulse current (20 kHz) was applied to the target surface, and the low refractive index layer indicated in Table 1 was used.

Example 11

In an example 11, the functional films were respectively formed on both surfaces of the base material by a magnetron sputtering method, and the far-infrared ray transmission member was obtained. As the functional film, only a mixed film of MgO and $NiO_x$ was formed as the low refractive index layer. The far-infrared ray transmission member was prepared by using the same method as that in the example 10 except that the mixed film of MgO and $NiO_x$ was formed by placing a pure Ni chip on an Mg target, and the low refractive index layer indicated in Table 1 was used. Regarding the low refractive index layer in the example 11, an atomic percentage of Ni with respect to the sum total of Ni and Mg was 11.7 atom %.

Example 12

The example 12 is different from the example 1 in that Si is formed as an adhesive film between the functional film and the base material. In the example 12, the adhesive film was formed on the base material by using a magnetron sputtering method, and an antireflection film was formed on the adhesive film by using a magnetron sputtering method. In the example 12, thicknesses of the functional film and the adhesive film indicated in Table 2 were used. Except the above description, the far-infrared ray transmission member was prepared by using the same method as that in the example 1.

Example 13

In an example 13, infrared transmission performance at the time when a transmission band forming film was formed between the functional film and the base material was calculated by using an optical simulation. A high refractive index layer of the transmission band forming film was Ge, an intermediate refractive index film was ZnS, and six layers of Ge films and ZnS films were alternately placed in order from a substrate. The low refractive index layer of the functional film was MgO, the high refractive index layer was ZnS, and the functional film was placed on the transmission band forming film. Optical constants of films obtained by using a vapor deposition method were used for the transmission band forming film and the functional film, and thicknesses of the functional film and a transmission band forming layer indicated in Table 3 were used. The optical simulation was performed by using simulation software (manufactured by HULINKS Inc., TFCalc).

(Total Optical Film Thickness)

As indicated in Table 1 to Table 3, it can be found that the total optical film thickness is equal to or larger than 2.5 μm in the example 4. The thickness and the refractive index were determined by performing fitting of an optical model using polarization information obtained by an infrared spectroscopic ellipsometer and a spectral transmission spectrum obtained by a Fourier transform type infrared spectroscopic device.

(Evaluation of Optical Performance)

Optical performance was evaluated for samples in the example 1 to the example 12. As the optical performance, an average transmittance and an average reflectance of the sample were measured by using a Fourier transform type infrared spectroscopic device (manufactured by Thermo Fisher Scientific Inc., product name: Nicolet iS10). The average transmittance is an average value of the transmittance of light at each wavelength from 8 μm to 12 μm, and the average reflectance is an average value of the reflectance of light at each wavelength from 8 μm to 12 μm. An evaluation result was indicated by a circle in a case in which both of the average transmittance and the average reflectance were determined to be "passed", and the evaluation result was indicated by a cross in a case in which at least one of the average transmittance and the average reflectance was determined to be "failed". The average reflectance equal to or lower than 10% was determined to be "passed", and the average reflectance higher than 10% was determined to be "failed". The average transmittance varies depending on the internal transmittance τ of the base material. The average transmittance equal to or higher than (τ-10)% was determined to be "passed", and the average transmittance equal to or lower than (τ-10)% was determined to be "failed". That is, in a case in which the base material was ZnS, the average transmittance equal to or higher than 87% was determined to be "passed", and the average transmittance lower than 87% was determined to be "failed". In a case in which the base material was Si, the average transmittance equal to or higher than 70% was determined to be "passed", and the average transmittance lower than 70% was determined to be "failed".

For the sample in the example 13, the average transmittance and the average reflectance were estimated based on a result of optical simulation.

Table 1 to Table 3 indicate evaluation results of optical performance. The example 1 to the example 3, the example 6, the example 7, and the example 10 to the example 13 are examples, and it can be found that the reflectance can be suppressed and the transmittance can be improved by using, as the functional film, oxide containing MgO as a principal component. The example 4 is a comparative example, and it can be found that, when a high refractive index film is used as the functional film, the average reflectance cannot be sufficiently reduced, and the entire film thickness is increased. The example 6 is a reference example, and it can be found that the reflectance can be suppressed and the transmittance can be improved by using $MgF_2$ as the functional film. However, the number of options of a forming process for $MgF_2$ is small. In other words, by using oxide as the functional film as in the examples, the number of options of the forming process can be increased while improving an optical characteristic similarly to $MgF_2$.

Figure 10:
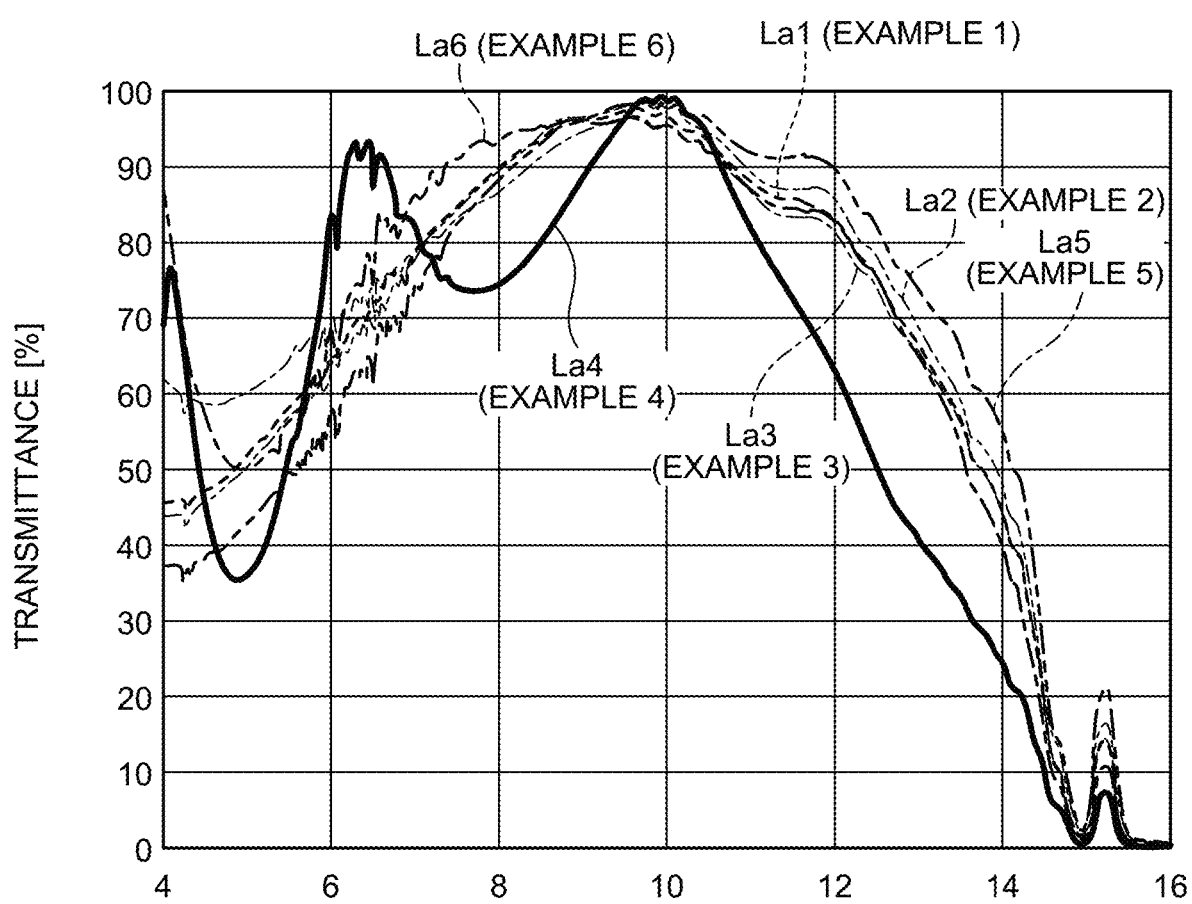
FIG. 10 is a graph illustrating evaluation results of respective examples.
Figure 11:
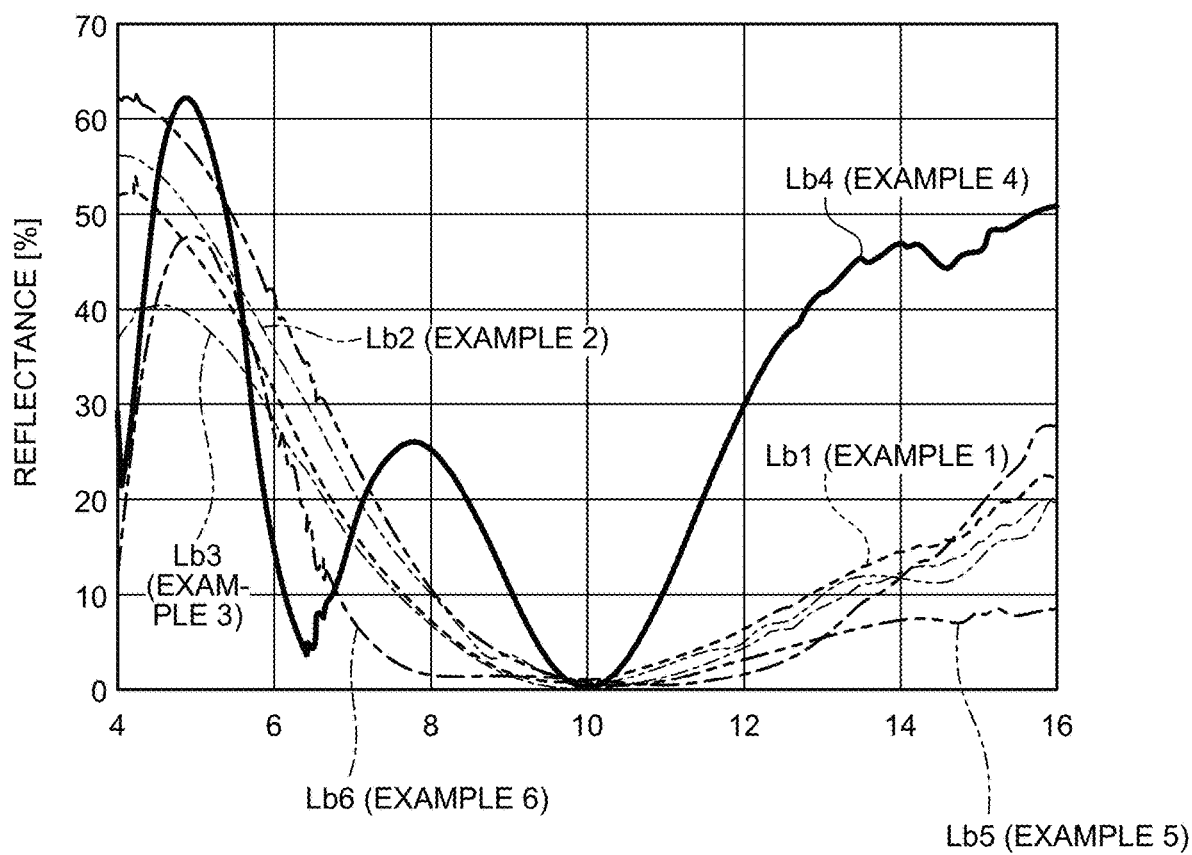
FIG. 11 is a graph illustrating evaluation results of respective examples.

FIG. 10 and FIG. 11 are graphs indicating evaluation results of the respective examples. FIG. 10 is a graph indicating the transmittance for each wavelength of light in the example 1 to the example 6, that is, in a case in which the base material is ZnS. In FIG. 10, a line segment La1 indicates a result of the example 1, a line segment La2 indicates a result of the example 2, a line segment La3 indicates a result of the example 3, a line segment La4 indicates a result of the example 4, a line segment La5 indicates a result of the example 5, and a line segment La6 indicates a result of the example 6. As illustrated in FIG. 10, it can be found that the transmittance at 8 μm to 12 μm, which is a wavelength range of far-infrared rays, is improved as a whole in the example 1, the example 2, the example 3, and the example 6 as the examples as compared with the example 4 as the comparative example.

FIG. 11 is a graph indicating the reflectance for each wavelength of light in the example 1 to the example 6, that is, in a case in which the base material is ZnS. In FIG. 10, a line segment Lb1 indicates a result of the example 1, a line segment Lb2 indicates a result of the example 2, a line segment Lb3 indicates a result of the example 3, a line segment Lb4 indicates a result of the example 4, a line segment Lb5 indicates a result of the example 5, and a line segment Lb6 indicates a result of the example 6. As illustrated in FIG. 11, it can be found that the example 1 to the example 5 are designed so that the reflectance becomes the lowest at 10 μm as a target wavelength, but the reflectance at 8 μm to 12 μm as a wavelength range of far-infrared rays is reduced as a whole in the example 1, the example 2, the example 3, and the example 6 as the examples as compared with the example 4 as the comparative example. In other words, it can be said that the configuration in which the low refractive index layer and the high refractive index layer are formed in order from the substrate is an effective configuration that can further reduce the average reflectance near the target wavelength. A low reflection wavelength band is widened in the example 6, which means that an antireflection wavelength band can be widened by forming a multilayer film by alternate lamination.

(Evaluation of Adhesion Performance)

Additionally, adhesion performance was evaluated. A tape test was performed to evaluate the adhesion performance. A sample passed the tape test was indicated by a circle, and a sample failed the tape test was indicated by a cross. The tape test was performed such that a piece of cellophane tape having a width of 18 mm, which is defined by JIS Z1522, is firmly attached to a deposition surface, and the cellophane tape was taken off while being pulled in a direction at 90°.

Table 1 to Table 3 indicate evaluation results of the adhesion performance. As indicated in Table 1 to Table 3, it can be found that the adhesion is increased in the example 1 to the example 3, the example 6, the example 7, and the example 10 to the example 12 as the examples. In the examples 4 and 5, it can be found that the adhesion is reduced in a case of forming Ge or $MgF_2$ by vapor deposition. That is, it can be found that it is more preferable to use oxide as the low refractive index layer because the adhesion can be increased.

(Evaluation of Water Resistance)

Additionally, water resistance was evaluated as optional evaluation. A boiling test was performed to evaluate water resistance performance. A sample passed the boiling test was indicated by a circle, and a sample failed the boiling test was indicated by a cross. The boiling test was performed by holding a film deposition substrate in pure water at 100° C.±3° C. for 10 minutes. After the boiling test, a sample in which peeling of a film is caused, or a sample in which the average transmittance at 8 μm to 12 μm varies by 5% or more was determined to be "failed". As indicated by the example 1, the example 3, the example 6, the example 7, and the example 12, it can be said that it is more preferable to form a high refractive index film on an MgO film because the water resistance performance can be improved. As indicated by the example 11, it can be said that it is more preferable to add an accessory component to MgO because the water resistance performance can be improved.

The embodiment of the present invention has been described above, but the embodiment is not limited thereto. The constituent elements described above include a constituent element that is easily conceivable by those skilled in the art, substantially the same constituent element, and what is called an equivalent. Furthermore, the constituent elements described above can be appropriately combined. In addition, the constituent elements can be variously omitted, replaced, or modified without departing from the gist of the embodiment described above.

REFERENCE SIGNS LIST

1 Glass for Vehicles
10, 12, 14 Glass Base Body
16 Intermediate Layer
18 Light Blocking Layer
20 Far-Infrared Ray Transmission Member
30 Base Material
32 Functional Film
34 Low Refractive Index Layer
36 High Refractive Index Layer

The invention claimed is:

1. A far-infrared ray transmission member comprising:
a base material configured to transmit far-infrared rays; and
a functional film that is formed on the base material, and comprises a low refractive index layer comprising an oxide as a principal component and having a refractive index equal to or smaller than 1.5 with respect to light at a wavelength of 10 μm,
wherein:
a thickness of the far-infrared ray transmission member is equal to or larger than 1.5 mm;
an optical thickness n1d1 of the low refractive index layer, as a product of a thickness d1 and a refractive index n1 with respect to light at a wavelength of 10 μm, is equal to or larger than 0.1 μm and equal to or smaller than 2.5 μm;
the low refractive index layer comprises MgO as a principal component, and a content of MgO is equal to or larger than 50 mass % and equal to or smaller than 100 mass % with respect to the entire low refractive index layer; and
the far-infrared ray transmission member is mounted on a vehicle.

2. The far-infrared ray transmission member according to claim 1, wherein an average refractive index of the low refractive index layer with respect to light at a wavelength equal to or larger than 8 μm and equal to or smaller than 12 μm is equal to or larger than 0.8 and equal to or smaller than 1.5.

3. The far-infrared ray transmission member according to claim 1, wherein an extinction coefficient of the low refractive index layer with respect to light at a wavelength of 10 μm is equal to or smaller than 0.1.

4. The far-infrared ray transmission member according to claim 1, wherein a reflectance with respect to light at a wavelength of 10 μm is equal to or lower than 10%.

5. The far-infrared ray transmission member according to claim 4, wherein an average reflectance with respect to light at a wavelength equal to or larger than 8 μm and equal to or smaller than 12 μm is equal to or lower than 10%.

6. The far-infrared ray transmission member according to claim 1, wherein the functional film further comprises a high refractive index layer that is formed on the opposite side of the base material side of the low refractive index layer and has a higher refractive index with respect to light at a wavelength of 10 μm than the refractive index of the low refractive index layer.

7. The far-infrared ray transmission member according to claim 6, wherein a refractive index of the high refractive index layer with respect to light at a wavelength of 10 μm is equal to or larger than 2.

8. The far-infrared ray transmission member according to claim 6, wherein a total value of an optical film thickness n1d1 of the low refractive index layer, as a product of a thickness d1 and a refractive index n1 with respect to light at a wavelength of 10 μm, and an optical film thickness n2d2 of the high refractive index layer being in contact with the low refractive index layer on the opposite side of the base material, as a product of a thickness d2 and a refractive index n2 with respect to light at a wavelength of 10 μm, is equal to or larger than 0.1 μm and equal to or smaller than 2.5 μm.

9. The far-infrared ray transmission member according to claim 6, wherein the high refractive index layer contains at least one material selected from the group consisting of Ge, Si, $NiO_x$, $CuO_x$, $Y_2O_3$, ZnS, $Bi_2O_3$, $ZrO_2$, ZnO, and diamond-like carbon.

10. The far-infrared ray transmission member according to claim 1, wherein an adhesive film that causes the base material and the functional film to adhere to each other is formed between the base material and the functional film.

11. The far-infrared ray transmission member according to claim 10, wherein the adhesive film contains at least one material selected from the group consisting of Si, Ge, MgO, $NiO_x$, $CuO_x$, ZnS, $Al_2O_3$, $ZrO_2$, $SiO_2$, $TiO_2$, ZnO, and $Bi_2O_3$.

12. The far-infrared ray transmission member according to claim 1, wherein the base material contains at least one material selected from the group consisting of Si, Ge, ZnS, and chalcogenide glass.

13. The far-infrared ray transmission member according to claim 1, further comprising a water-resistant layer on the low refractive index layer.

14. The far-infrared ray transmission member according to claim 1, wherein the low refractive index layer comprises $NiO_x$.

15. The far-infrared ray transmission member according to claim 1, wherein the low refractive index layer does not comprise $Bi_2O_3$.

16. A method for manufacturing a far-infrared ray transmission member, the method comprising:

manufacturing a far-infrared ray transmission member by forming, on a base material configured to transmit far-infrared rays, a functional film comprising a low refractive index layer comprising an oxide as a principal component and having a refractive index equal to or smaller than 1.5 with respect to light at a wavelength of 10 μm, wherein:

a thickness of the far-infrared ray transmission member is equal to or larger than 1.5 mm;

an optical thickness n1d1 of the low refractive index layer, as a product of a thickness d1 and a refractive index n1 with respect to light at a wavelength of 10 μm, is equal to or larger than 0.1 μm and equal to or smaller than 2.5 μm;

the low refractive index layer comprises MgO as a principal component, and a content of MgO is equal to or larger than 50 mass % and equal to or smaller than 100 mass % with respect to the entire low refractive index layer; and the far-infrared ray transmission member is mounted on a vehicle.

17. The method for manufacturing the far-infrared ray transmission member according to claim 16, wherein the low refractive index layer is formed by sputtering.

\* \* \* \* \*